(12) United States Patent
Mizuki et al.

(10) Patent No.: US 10,179,284 B2
(45) Date of Patent: Jan. 15, 2019

(54) INFORMATION PROCESSING SYSTEM, SERVER, STORAGE MEDIUM HAVING STORED THEREIN INFORMATION PROCESSING PROGRAM, AND INFORMATION PROCESSING METHOD

(71) Applicant: NINTENDO CO., LTD., Kyoto (JP)

(72) Inventors: Kiyoshi Mizuki, Kyoto (JP); Shinobu Fukumoto, Kyoto (JP); Ichito Nagata, Tokyo (JP); Tomo Tsubota, Tokyo (JP); Kota Harada, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 182 days.

(21) Appl. No.: 15/242,976

(22) Filed: Aug. 22, 2016

(65) Prior Publication Data
US 2017/0203209 A1 Jul. 20, 2017

(30) Foreign Application Priority Data

Jan. 20, 2016 (JP) .................. 2016-009110

(51) Int. Cl.
*G07F 17/32* (2006.01)
*A63F 13/35* (2014.01)
(Continued)

(52) U.S. Cl.
CPC .......... *A63F 13/35* (2014.09); *A63F 13/2145* (2014.09); *A63F 13/26* (2014.09);
(Continued)

(58) Field of Classification Search
CPC ............ G07F 17/3255; G07F 17/326
See application file for complete search history.

(56) References Cited

U.S. PATENT DOCUMENTS 8,839,117 B1 9/2014 Smith
2008/0268947 A1 10/2008 Fyock
(Continued)

FOREIGN PATENT DOCUMENTS

JP 2013-165877 8/2013
WO 2013/152042 10/2013

OTHER PUBLICATIONS

Extended European Search Report dated Jan. 16, 2017 issued in corresponding European Application No. 16185098.7 (7 pgs.).
(Continued)

*Primary Examiner* — James S McClellan
*Assistant Examiner* — Sylvia Weatherford
(74) *Attorney, Agent, or Firm* — Nixon & Vanderhye PC

(57) ABSTRACT

An example of an information processing system includes one or more terminal apparatuses and a server. Each of the one or more terminal apparatuses transmits, to the server, action information indicating an action of a user regarding the terminal apparatus. The server receives the action information from the terminal apparatus. The server stores, for respective types of actions, pieces of history information, each indicating a numerical value corresponding to history of the action of the user. Based on the received action information, the server updates history information corresponding to the action information. Under the condition that a combination of the plurality of pieces of history information satisfies a predetermined combination condition, the server transmits provision information to a terminal apparatus that is the same as or different from the terminal apparatus as the transmission source of the action information.

26 Claims, 15 Drawing Sheets

(51) Int. Cl.
> *H04L 29/06* (2006.01)
> *H04L 29/08* (2006.01)
> *A63F 13/79* (2014.01)
> *A63F 13/2145* (2014.01)
> *A63F 13/26* (2014.01)
> *A63F 13/335* (2014.01)
> *A63F 13/332* (2014.01)
> *A63F 13/92* (2014.01)
> *A63F 13/69* (2014.01)
> *A63F 13/61* (2014.01)
> *A63F 13/323* (2014.01)

(52) U.S. Cl.
> CPC .......... *A63F 13/323* (2014.09); *A63F 13/332* (2014.09); *A63F 13/335* (2014.09); *A63F 13/61* (2014.09); *A63F 13/69* (2014.09); *A63F 13/79* (2014.09); *A63F 13/92* (2014.09); *G07F 17/3237* (2013.01); *G07F 17/3255* (2013.01); *H04L 67/22* (2013.01); *H04L 67/42* (2013.01); *A63F 2300/575* (2013.01); *G07F 17/32* (2013.01)

(56) References Cited

U.S. PATENT DOCUMENTS

| | | |
|---|---|---|
| 2013/0217502 A1 | 8/2013 | Takahashi et al. |
| 2014/0038721 A1 | 2/2014 | Archer |
| 2015/0050990 A1* | 2/2015 | Colvin ................ G07F 17/3255 463/25 |
| 2015/0224399 A1 | 8/2015 | Melo |

OTHER PUBLICATIONS

Nintendo Support—My Nintendo FAQ, retrieved May 21, 2018, 61 pages. http://en-americas-support.nintendo.com/app/answers/detail/a_id/16541/p/855.

Wikipedia—Club Nintendo, retrieved May 21, 2018, 5 pages. https://en.wikipedia.org/wiki/Club_Nintendo.

Nintendo Life, "Satoru Iwata Highlights the Planned Connectivity of the Club Nintendo Replacement," by Thomas Whitehead, May 14, 2015, 28 pages. http://www.nintendolife.com/news/2015/05/satoru_iwata_highlights_the_planned_connectivity_of_the_club_nintendo_replacement.

\* cited by examiner

FIG. 8

| CONTENT OF ACTION | CONTENT OF GIVEN POINTS |
|---|---|
| APP A: CLEARING OF STAGE | PRIMARY PLAY POINTS OF APP A: 2 |
| APP A: ONLINE COMPETITION | PRIMARY PLAY POINTS OF APP A: 1 |
| ⋮ | ⋮ |
| APP B: CLEARING OF STAGE | PRIMARY PLAY POINTS OF APP B: 1 |
| ⋮ | ⋮ |
| APP C: CLEARING OF STAGE | SECONDARY PLAY POINTS: 1 |
| ⋮ | ⋮ |
| PURCHASE OF ADDITIONAL CONTENT | PURCHASE POINTS: 1 |
| ⋮ | ⋮ |
| VIEWING OF PROMOTIONAL MOVING IMAGE | ADVERTISEMENT POINTS: 1 |
| ⋮ | ⋮ |

FIG. 12

| COMBINATION CONDITION (PLAY POINTS, ADVERTISEMENT POINTS, PURCHASE POINTS) | PRIVILEGE |
|---|---|
| (5, 2, 3) | 500-POINT COUPON |
| (10, 4, 5) | 1000-POINT COUPON |
| ⋮ | ⋮ |
| (10, 2, 1) | ADDITIONAL ITEM |
| ⋮ | ⋮ |

INFORMATION PROCESSING SYSTEM, SERVER, STORAGE MEDIUM HAVING STORED THEREIN INFORMATION PROCESSING PROGRAM, AND INFORMATION PROCESSING METHOD

CROSS REFERENCE TO RELATED APPLICATION

The disclosure of Japanese Patent Application No. 2016-009110, filed on Jan. 20, 2016, is incorporated herein by reference.

FIELD

The technology relates to an information processing system including a terminal apparatus and a server.

BACKGROUND AND SUMMARY

Conventionally, there is a technique for giving a privilege to a user in accordance with the content of the play of a game in a terminal apparatus such as a game apparatus. For example, a privilege is given in accordance with a particular action (e.g., performing a communication competition or the like), whereby it is possible to provide the user with a motivation to perform the action.

If it is possible to cause the user to perform not only a particular action but also various actions, the user uses the terminal apparatus in various forms. As a result, it is possible to promote the use of the terminal apparatus. Thus, it is desirable to provide the user with a motivation to perform various actions.

Therefore, the present application discloses an information processing system capable of providing a user with a motivation to perform various actions in a terminal apparatus.

(1)
An example of an information processing system according to the present specification includes one or more terminal apparatuses and a server.

Each of the one or more terminal apparatuses includes: one or more processors; and a transmission section configured to transmit, to the server, action information indicating an action of a user regarding the terminal apparatus.

The server includes a reception section, a storage section, one or more processors, and a transmission section. The reception section receives the action information from the terminal apparatus. The storage section stores, for respective types of actions, pieces of history information, each indicating a numerical value corresponding to history of the action of the user. Based on the action information received by the reception section, the one or more processors of the server update one of the pieces of history information corresponding to the action information. Under the condition that a combination of the plurality of pieces of history information satisfies a predetermined combination condition, the transmission section transmits provision information to a terminal apparatus that is the same as or different from the terminal apparatus as the transmission source of the action information.

The terminal apparatus configured to receive the provision information from the server performs predetermined information processing based on the received provision information.

(2)
The reception section of the server may receive, from the terminal apparatus, first action information indicating an operation of the user regarding a first application executed by the terminal apparatus and receive, from the terminal apparatus, second action information indicating an operation of the user regarding a second application executed by the terminal apparatus. The one or more processors of the server may update one of the pieces of history information corresponding to the first action information based on the first action information and update one of the pieces of history information corresponding to the second action information based on the second action information.

(3)
At least one of the plurality of pieces of history information may include first primary history information corresponding to the first application, second primary history information correspond to the second application, and secondary history information. The one or more processors of the server may update the first primary history information based on the first action information, update the second primary history information based on the second action information, and calculate the secondary history information based on the first primary history information and the second primary history information. Under the condition that the plurality of pieces of history information including the secondary history information satisfy a predetermined combination condition, the transmission section of the server may transmit provision information to a terminal apparatus that is the same as or different from the terminal apparatus as the transmission source of the action information.

(4)
Under the condition that an individual piece of primary history information satisfies a predetermined individual condition, the transmission section of the server may transmit provision information regarding an application corresponding to the individual piece of primary history information to the terminal apparatus as the transmission source of the action information.

(5)
In accordance with a request from the terminal apparatus, the one or more processors of the server may convert a numerical value indicated by primary history information into a numerical value indicated by the secondary history information, thereby calculating the secondary history information, and may not convert a numerical value indicated by a certain piece of primary history information into a numerical value indicated by another piece of primary history information.

(6)
In accordance with a request from the terminal apparatus, the one or more processors of the server may convert a numerical value indicated by primary history information into a numerical value indicated by the secondary history information, thereby calculating the secondary history information, and may not convert the numerical value indicated by the secondary history information into the numerical value indicated by the primary history information.

(7)
The information processing system may further include a first type of terminal apparatus and a second type of terminal apparatus. The first type of terminal apparatus has a first platform compatible with the first application and the second application and incompatible with a third application. The second type of terminal apparatus has a second platform compatible with the third application and incompatible with the first application and the second application. The reception section of the server may receive the first action information and the second action information from the first type of terminal apparatus and receive third action information indicating an operation of the user regarding the third application from the second type of terminal apparatus. The one or more processors of the server may update the secondary history information using the third action information.

(8)

The information processing system may further include a first type of terminal apparatus and a second type of terminal apparatus. The first type of terminal apparatus has a first platform compatible with a first application and incompatible with a third application. The second type of terminal apparatus has a second platform compatible with the third application and incompatible with the first application. The reception section of the server receives, from the first type of terminal apparatus, first action information indicating an operation of the user regarding the first application executed by the first type of terminal apparatus and receives, from the second type of terminal apparatus, second action information indicating an operation of the user regarding the third application executed by the second type of terminal apparatus.

(9)

The one or more processors of the server may update predetermined history information based on the first action information and update the predetermined history information based on the second action information.

(10)

The terminal apparatus may be able to transmit action information indicating a first action and may be able to transmit action information indicating a second action. The one or more processors of the server may update predetermined history information corresponding to the action information based on the action information indicating the first action and update the predetermined history information based on the action information indicating the second action.

(11)

The storage section of the server may store user identification information indicating the user and the plurality of pieces of history information regarding the user in association with each other. The reception section of the server may receive the action information associated with the user identification information from the terminal apparatus. Based on the action information, the one or more processors of the server may update one of the pieces of history information stored in association with the user identification information associated with the action information.

(12)

Every time the action information is received, the one or more processors of the server may increase a numerical value indicated by one of the pieces of history information corresponding to the action information, thereby updating the history information.

(13)

Regarding a plurality of pieces of history information, the server may not convert a numerical value indicated by one of the plurality of pieces of history information into a numerical value indicated by another one of the pieces of history information.

(14)

The action information may indicate at least one of:
the fact that the terminal apparatus logs into a predetermined network service;
a predetermined condition is satisfied in a predetermined application executed by the terminal apparatus;
a predetermined operation regarding a notification to the user is performed in the terminal apparatus;
in a predetermined application executed by the terminal apparatus, the user of the terminal apparatus communicates with another user;
a content is acquired in the terminal apparatus; and
the user who owns the terminal apparatus visits a predetermined place.

(15)

The transmission section of the server may transmit, as the provision information, data of a content to be given to the user and/or information of a notification regarding giving of a content.

(16)

The storage section of the server may store information indicating a plurality of types of contents and information indicating the combination condition for allowing the plurality of types of contents to be given, in association with each other. The reception section of the server may receive, from the terminal apparatus, selection information indicating a content selected by the user among contents for which the combination condition is satisfied. The transmission section of the server may transmit provision information regarding the content indicated by the received selection information.

(17)

Under the condition that a combination of the plurality of pieces of history information satisfies a predetermined combination condition, the transmission section of the server may transmit provision information to the same terminal apparatus as the terminal apparatus as the transmission source of the action information.

(18)

Under the condition that a combination of the plurality of pieces of history information satisfies a predetermined combination condition, the transmission section of the server may transmit provision information to a terminal apparatus different from the terminal apparatus as the transmission source of the action information.

(19)

The information processing system may further include a first terminal apparatus and a second terminal apparatus. The reception section of the server may receive the action information from the first terminal apparatus. The one or more processors of the server may identify a second terminal apparatus corresponding to the first terminal apparatus having transmitted the action information. When the combination condition is satisfied, the transmission section of the server may transmit the provision information to the second terminal apparatus corresponding to the first terminal apparatus having transmitted the action information that satisfies the combination condition.

(20)

The transmission section of the terminal apparatus may transmit, to the server, action information indicating an operation of the user regarding a game application executed by the terminal apparatus.

It should be noted that the present specification discloses an information processing apparatus (an information processing apparatus on a server side or an information processing apparatus on a terminal side) included in the information processing system in the above (1) to (20) and discloses a storage medium having stored therein an information processing program for causing a computer (a processor) of the information processing apparatus to execute some processes of the information processing apparatus.

Further, the present specification discloses an information processing method performed by the information processing system.

According to the information processing system, the server, the storage medium having stored therein the information processing program, and the information processing method, it is possible to provide a user with a motivation to perform various actions in a terminal apparatus.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 8 is a diagram showing a non-limiting example of a point table;

FIG. 12 is a diagram showing a non-limiting example of a privilege table;

DETAILED DESCRIPTION OF NON-LIMITING EXAMPLE EMBODIMENTS

[1. Overall Configuration of System]

Figure 1:
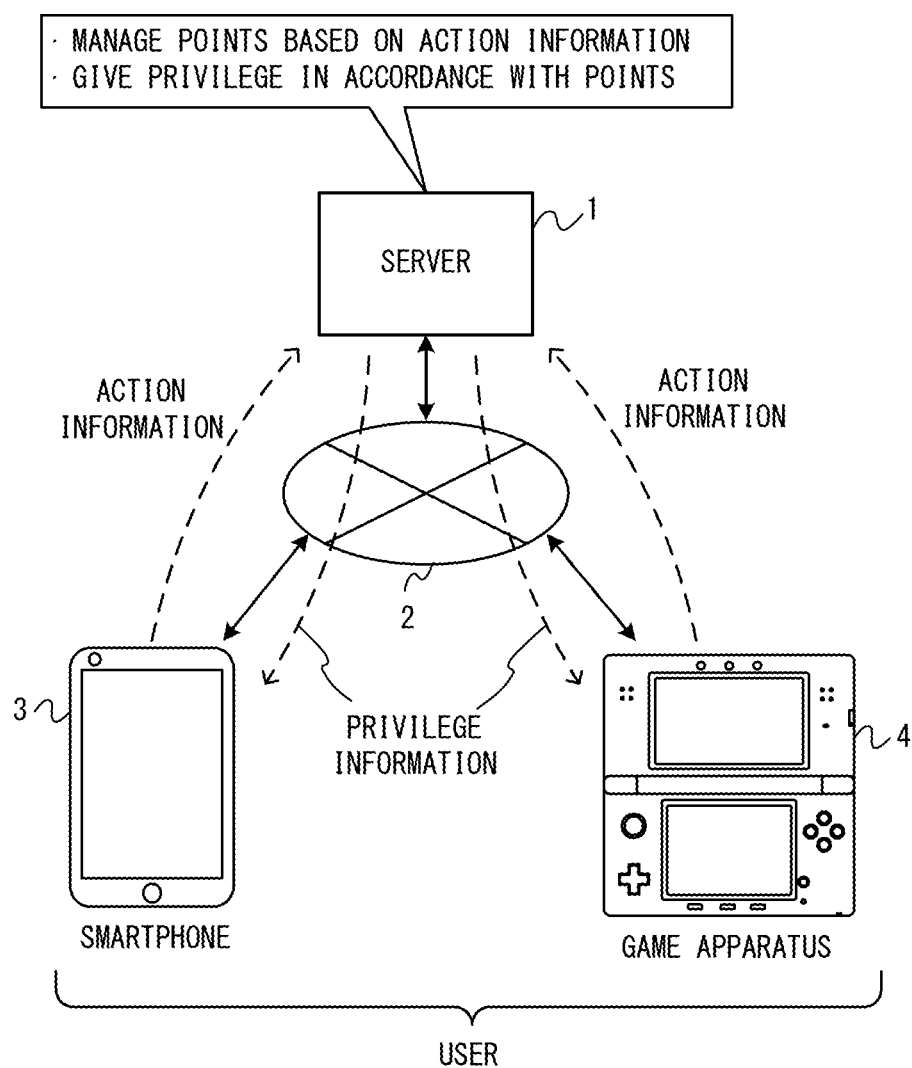
FIG. 1 is a diagram showing a non-limiting example of the configuration of an information processing system according to an exemplary embodiment.

With reference to the drawings, a description is given below of an information processing system, a server, an information processing program, and an information processing method according to an exemplary embodiment. First, a description is given of the overall configuration of the information processing system according to the exemplary embodiment and an overview of each terminal apparatus and a server included in the information processing system. FIG. 1 is a diagram showing an example of the configuration of the information processing system according to the exemplary embodiment. As shown in FIG. 1, the information processing system includes a server 1, a smartphone 3, and a game apparatus 4. These terminal apparatuses (i.e., the smartphone 3 and the game apparatus 4) and the server 1 can connect to a network 2 such as the Internet and/or a mobile communication network.

The server 1 provides a network service for the smartphone 3 and the game apparatus 4 (in other words, a user who owns the smartphone 3 and the game apparatus 4). For example, the server 1 provides an application executed by a terminal apparatus (i.e., the smartphone 3 or the game apparatus 4) or provides an environment for executing the application. That is, the server 1 may have the function of a shop server for providing an application for the terminal apparatus in electronic commerce. Further, the server 1 may have the function of a game server for, in a case where the application is a game application, cooperating with game processing in the terminal apparatus to advance a game. It should be noted that in the present specification, an application for the smartphone 3, in other words, an application that can be executed by the smartphone 3, is referred to as a "smartphone app". Further, an application for the game apparatus 4, in other words, an application that can be executed by the game apparatus 4, is referred to as a "game apparatus app".

It should be noted that in the present specification, a provider who implements the exemplary embodiment using the server 1 is referred to as an "implementation provider". The implementation provider refers to a person who substantially operates a service using the server 1. The implementation provider does not need to be an owner of the server 1, and does not need to be a person who manages or maintains the server 1.

The smartphone 3 is an example of an information processing apparatus owned by a user and can also be said to be an example of a smart device. That is, the meaning of the term "smart device" includes a smartphone. The smartphone 3 may be an off-the-shelf smartphone and may be a smartphone in which an existing OS (operating system) such as Android (registered trademark) or iOS (registered trademark) is incorporated (in other words, may have an off-the-shelf platform). That is, the smartphone 3 may be achieved by installing the function of performing a process in the exemplary embodiment on an off-the-shelf smartphone. Further, a smartphone app in the exemplary embodiment may be able to be acquired from an existing app provision service such as "Google Play (registered trademark)" or "App Store (registered trademark)".

It should be noted that the smartphone 3 can also be said to be an example of a multifunctional information terminal. Here, the multifunctional information terminal refers to, for example, an information processing apparatus having the following functions.

The function of executing an application (e.g., a browser, a mailer, a game application, or the like)

The function of outputting an image (or a moving image) and a sound

A network communication function (e.g., the function of performing communication via a wireless LAN, the function of performing communication via a mobile communication network, or the like)

In addition to the above, the multifunctional information terminal may have a photographing function using a camera, a near field wireless communication function (e.g., the function of performing communication using Bluetooth (registered trademark) or NFC (Near Field Communication)), a position detection function (e.g., a GPS function), and the like.

The game apparatus 4 is an example of an information processing apparatus owned by the user and is an example of an information processing apparatus of a type different from that of the smartphone 3. The game apparatus 4, which executes a game application, can also execute another type of application (e.g., a browser application, a moving image reproduction application, or the like). In the exemplary embodiment, the smartphone 3 is an off-the-shelf information processing apparatus, whereas the game apparatus 4 is an information processing apparatus manufactured by the implementation provider and provided for the user. The game apparatus 4 is an information processing apparatus capable of executing an application provided by the implementation provider.

It should be noted that FIG. 1 shows a single smartphone 3 and a single game apparatus 4. In the exemplary embodiment, however, the information processing system includes a plurality of smartphones and a plurality of game apparatuses.

In addition, in the exemplary embodiment, as an example, a case is described where a single user owns the smartphone 3 and the game apparatus 4 (see FIG. 1). That is, hereinafter, as an example, a case is described where a service in the server 1 is provided for a user who owns both the smartphone 3 and the game apparatus 4. In the exemplary embodiment, however, not all the users who receive the provision of a service by the server 1 need to own both the smartphone 3 and the game apparatus 4. A user who owns only a smartphone can receive the provision of a service regarding a smartphone in the above service. A user who owns only a game apparatus can receive the provision of a service regarding a game apparatus in the above service.

It should be noted that in the exemplary embodiment, "a user" includes the meaning "a user associated with an account for the network service". That is, in the exemplary embodiment, a single account for the network service provided by the server 1 is regarded as a single user. Thus, if a plurality of people share a single account, the information processing system regards the plurality of people collectively as a single user. Thus, for example, in a case where a certain person A owns the smartphone 3 and a person B, who is a member of the person's family, owns the game apparatus 4, the person A and the person B are regarded as a single user. If, on the other hand, a single person has a plurality of accounts, the person is regarded as different users for the respective accounts.

As shown in FIG. 1, in the exemplary embodiment, a terminal apparatus (the smartphone 3 or the game apparatus 4) transmits, to the server 1, action information indicating an action of the user regarding the terminal apparatus. It should be noted that although the details will be described later, "an action of the user regarding the terminal apparatus" may be, for example, an action of the user performed using the terminal apparatus (e.g., the action of viewing a moving image using the terminal apparatus), or may be an operation of the user performed on the terminal apparatus (e.g., an operation on an application executed by the terminal apparatus). If any one of a plurality of types of actions defined in advance is performed, the terminal apparatus transmits, to the server 1, action information indicating the performed action.

The server 1 having received the action information manages points based on the action information (see FIG. 1). Here, the points are points set in the network service. In the exemplary embodiment, a privilege is given to the user in accordance with points. Based on the received action information, the server 1 gives points to the user. Although the details will be described later, for example, in a case where a predetermined game condition is achieved in a game application executed by the terminal apparatus, a case where a moving image of an advertisement in the network service is viewed using the terminal apparatus, or a case where a product is purchased using the terminal apparatus in the network service, points are given to the user (in other words, the account of the user) having performed these actions.

In addition, the server 1 gives a privilege to the user in accordance with given points (see FIG. 1). At this time, the server 1 transmits, to the terminal apparatus, privilege information regarding the privilege to be given to the user (the details will be described later).

As described above, the information processing system according to the exemplary embodiment gives points in accordance with an action of the user regarding the terminal apparatus. Consequently, the information processing system provides the user with a motivation to perform various actions in the terminal apparatus, thereby promoting the use of the terminal apparatus.

[2. Configuration of Each Apparatus]

Figure 2:
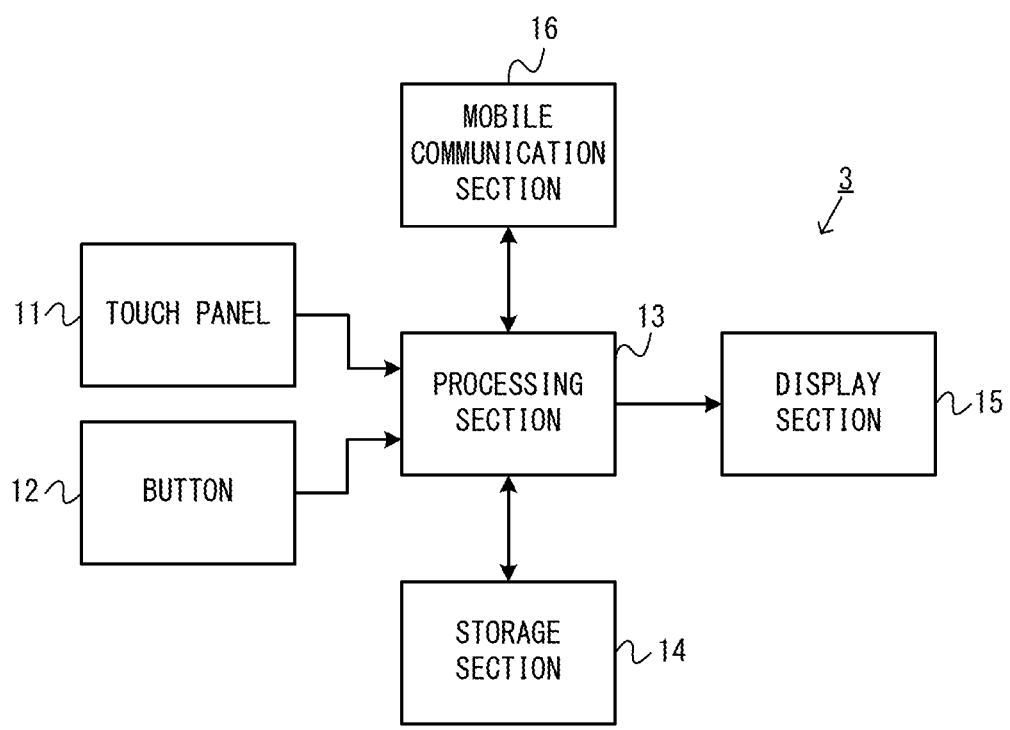
FIG. 2 is a block diagram showing a non-limiting example of the configuration of a smartphone.
Figure 3:
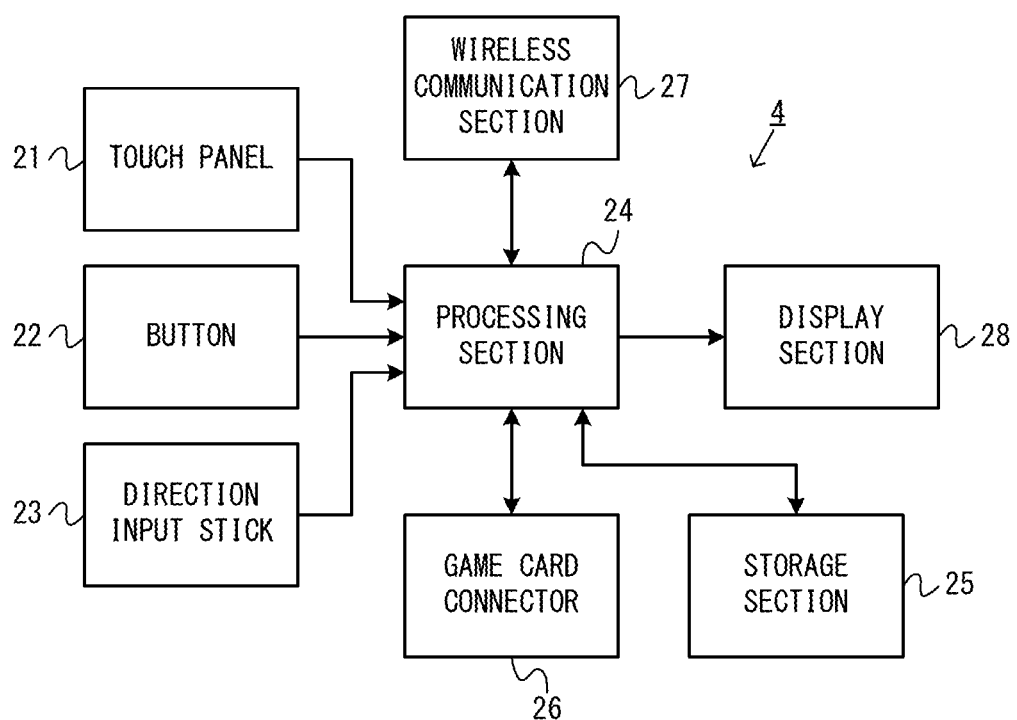
FIG. 3 is a block diagram showing a non-limiting example of the configuration of a game apparatus.

Next, with reference to FIGS. 2 and 3, a description is given of a specific example of the configuration of each apparatus or the server included in the information processing system according to the exemplary embodiment.

(Specific Example of Configuration of Smartphone)

FIG. 2 is a block diagram showing an example of the configuration of the smartphone 3. As shown in FIG. 2, the smartphone 3 includes a touch panel 11 and a button 12 as an example of an input section. Further, the smartphone 3 includes a display section 15. The touch panel 11 is provided on a screen of the display section 15. The display section 15 displays an image (e.g., an image of an application or the like) generated by information processing performed by the processing section 13 of the smartphone 3. The button 12 is, for example, used to switch between an on-state and an off-state of the power supply of the smartphone 3, or switch between an on-state and an off-state of the screen display of the display section 15. It should be noted that the smartphone 3 may include a loudspeaker, a microphone, a camera, and/or the like.

The smartphone 3 includes a processing section 13 and a storage section 14. The processing section 13 is electrically connected to the components 11, 12, and 14 to 16 of the smartphone 3. The processing section 13 includes a CPU (Central Processing Unit) and a memory. In the smartphone 3, various types of information processing are performed by the CPU executing a program stored in the storage section 14, using the memory. The storage section 14 stores a program executed by the processing section 13, data used for information processing performed by the processing section 13, data obtained by the information processing, and the like.

It should be noted that the smartphone 3 includes a platform for executing an application. Here, the platform of the smartphone 3 refers to a component for executing an application, which is achieved by hardware (i.e., the CPU or the like) included in the processing section 13 and an OS (an operating system, also referred to as a "system program") stored in the storage section 14. In the exemplary embodiment, the platform of the smartphone 3 is a platform using an existing OS (not an OS developed by the implementation provider) such as Android (registered trademark) or iOS. An application program stored in the storage section 14 is executed on the above platform. It should be noted that the platform of the smartphone 3 is compatible with a smartphone app and incompatible with a game apparatus app.

The smartphone 3 includes a mobile communication section 16, which connects to a mobile communication network (in other words, a mobile phone network) and performs communication. In the exemplary embodiment, the smartphone 3 (specifically, the processing section 13) connects to the network 2 using the mobile communication section 16 (in other words, via the mobile communication section 16), thereby communicating with another apparatus (e.g., the server 1 or the like). It should be noted that the configuration of a communication section for the smartphone 3 to perform communication via the network 2 is any configuration. It should be noted that the smartphone 3 may include communication means different from the mobile communication section 16. For example, the smartphone 3 may have the function of connecting to a wireless LAN by a communication module authenticated for Wi-Fi, and may connect to the Internet via the wireless LAN and communicate with the server 1.

It should be noted that the smartphone 3 may include another component in addition to the components shown in FIG. 2. For example, the smartphone 3 may have the function of performing communication by NFC, the function of detecting the position of the smartphone 3 (e.g., a GPS function), and/or the like.

In the exemplary embodiment, the smartphone 3 has been described as an example of a general-purpose multifunctional information terminal owned by the user. Here, in another exemplary embodiment, the information processing system may include another type of multifunctional information terminal instead of the smartphone 3. For example, the information processing system may be configured to include a smart device such as a tablet as a multifunctional information terminal, or may be configured to include as a multifunctional information terminal an information processing apparatus that can be attached to the user (a so-called wearable terminal) such as a wristwatch-type or eyeglass-type terminal.

(Specific Example of Configuration of Game Apparatus)
FIG. 3 is a block diagram showing an example of the configuration of the game apparatus 4. As shown in FIG. 3, the game apparatus 4 includes a touch panel 21, a button 22, and a direction input stick 23 as an example of an input section. Further, the game apparatus 4 includes a display section 28. It should be noted that the game apparatus 4 may include a loudspeaker, a microphone, a camera, and/or the like.

The touch panel 21 is provided on a screen of the display section 28. The display section 28 displays an image (e.g., a game image or the like) generated by information processing performed by the processing section 24 of the game apparatus 4.

The button 22 is an input section used to give an instruction to control the game apparatus 4 (e.g., the turning on and off of the power supply or the like), and/or an input instruction in an application executed by the game apparatus 4. For example, the game apparatus 4 may include a button for switching between an on-state and an off-state of the power supply of the game apparatus 4, or switching between an on-state and an off-state of the screen display of the game apparatus 4, and a button for providing a predetermined game input in a game application executed by the game apparatus 4. As described above, the game apparatus 4 may include a plurality of buttons as the button 22. Further, the game apparatus 4 may include a plurality of buttons as a button for a game (i.e., a button used to give an input instruction in a game application executed by the game apparatus 4).

In addition, the direction input stick 23 is an example of an operation section that allows the provision of a direction input regarding at least four directions, namely up, down, left, and right directions. The direction input stick 23 is, for example, an analog stick or a slide stick (also referred to as a "slide pad"). The direction input stick 23 includes a stick member that can be tilted (or slid) in all the directions parallel with the main surface of the housing of the game apparatus 4 (i.e., 360° directions including up, down, left, right, and oblique directions). The user tilts (or slides) the stick member and thereby can input a direction corresponding to the tilt direction (and input a magnitude corresponding to the angle of the tilt). It should be noted that the game apparatus 4 may include a directional pad as an operation section that allows a direction input. For example, the direction input stick 23 is used to provide a direction input in a game application executed by the game apparatus 4.

In addition, the game apparatus 4 includes a game card connector 26. The game card connector 26 is a connector for connecting to a game card attached to the game apparatus 4. Here, the game apparatus 4 includes a slot for allowing a dedicated game card to be attached to and detached from the game apparatus 4. It should be noted that the "dedicated game card" means a storage medium that can be attached to the game apparatus 4 and cannot be attached to an apparatus (at least the smartphone 3) of a type different from that of the game apparatus 4. In the exemplary embodiment, the game card is manufactured by the implementation provider or another person authorized by the implementation provider. The game card attached to the slot is connected to the game card connector 26 and can be accessed by the processing section 24 of the game apparatus 4. For example, the game card stores a program (e.g., a program of a game application) that can be executed by the game apparatus 4 and/or data (e.g., game data and saved data used in a game application) used in a program executed by the game apparatus 4.

The game apparatus 4 includes a processing section 24 and a storage section 25. The processing section 24 is electrically connected to the components 21 to 23 and 25 to 28 of the game apparatus 4. The processing section 24 includes a CPU and a memory. In the game apparatus 4, various types of information processing are performed by the CPU executing a program stored in the storage section 25 and/or a program stored in a game card attached to the game apparatus 4, using the memory. The storage section 25 stores a program executed by the processing section 24, data used for information processing performed by the processing section 24, data obtained by the information processing, and the like.

It should be noted that the game apparatus 4 includes a platform for executing an application. The platform of the game apparatus 4 refers to a component for executing an application, which is achieved by hardware (i.e., a CPU or the like) included in the processing section 24 and an OS stored in the storage section 25. In the exemplary embodiment, the platform of the game apparatus 4 is a platform using a dedicated OS in the game apparatus 4. An application stored in the storage section 25 or a game card is executed on the above platform. It should be noted that the platform of the game apparatus 4 is compatible with a game apparatus app and incompatible with a smartphone app.

The game apparatus 4 includes a wireless communication section 27, which has the function of communicating with another apparatus via the network 2. For example, the wireless communication section 27 may be a communication module authenticated for Wi-Fi and may be able to connect to a wireless LAN. The game apparatus 4 (specifically, the processing section 24) connects to the network 2 using the wireless communication section 27 (in other words, via the wireless communication section 27), thereby communicating with another apparatus (e.g., the server 1 or the like). It should be noted that the configuration of a communication section for the game apparatus 4 to perform communication via the network 2 is any configuration. Further, the game apparatus 4 may include a short distance communication section having the function of performing near field wireless communication with an apparatus (e.g., a game apparatus of the same type as the game apparatus 4) around the game apparatus 4. For example, the short distance communication section may be a communication module for performing communication based on the Bluetooth (registered trademark) standard, or may be a communication module for performing infrared light communication. It should be noted that in another exemplary embodiment, the game apparatus 4 may include a mobile communication section for connecting to a mobile communication network and performing communication.

It should be noted that the game apparatus 4 may include another component in addition to the components shown in FIG. 3. For example, the game apparatus 4 may have the function of performing communication by NFC, the function of detecting the position of the game apparatus 4 (e.g., a GPS function), and/or the like.

(Difference Between Smartphone 3 and Game Apparatus 4)

As described above, the smartphone 3 and the game apparatus 4 are information processing apparatuses of different types from each other. Specifically, the smartphone 3 and the game apparatus 4 are different in the following respects and therefore can be said to be information processing apparatuses of different types.

First, the smartphone 3 and the game apparatus 4 are different in a platform for executing an application. That is, the smartphone 3 executes an application (i.e., a smartphone app) using a platform based on an existing OS, whereas the game apparatus 4 executes an application (i.e., a game apparatus app) using a platform based on a dedicated OS for the game apparatus 4, which is different from an existing OS. The smartphone 3 is compatible with a smartphone app and incompatible with a game apparatus app, whereas the game apparatus 4 is compatible with a game apparatus app and incompatible with a smartphone app. As described above, the smartphone 3 and the game apparatus 4 are different in executable applications.

In addition, the smartphone 3 and the game apparatus 4 are different in that the smartphone 3 has the function of performing communication via a mobile communication network (in other words, a mobile phone network) (which can also be said to be a call function via a mobile communication network), whereas the game apparatus 4 does not have this function.

In addition, the smartphone 3 and the game apparatus 4 are different in that the game apparatus 4 includes an operation apparatus that allows a direction input (the direction input stick 23 in the exemplary embodiment), whereas the smartphone 3 does not include such an operation apparatus. Generally, in a game application, a direction input is often provided, and therefore, the operation apparatus that allows a direction input can be said to be an operation apparatus for a game operation. The game apparatus 4 includes such an operation section for a game operation and therefore is an information processing apparatus suitable for a game. Thus, the game apparatus 4 can be said to be an information processing apparatus for a game. The smartphone 3 and the game apparatus 4 are different in that the smartphone 3 is a general-purpose information processing apparatus (in other words, a multifunctional information terminal), whereas the game apparatus 4 is an information processing apparatus for a game. It should be noted that as described above, the game apparatus 4 is an information processing apparatus for a game, but can be used not only for game use. For example, the game apparatus 4 may have a browser function by installing a browser application on the game apparatus 4, or may have a moving image reproduction function by installing a moving image reproduction application on the game apparatus 4, or may have a photographing function by including a camera.

In addition, the smartphone 3 and the game apparatus 4 are different in that a dedicated game card can be attached to the game apparatus 4, whereas this game card cannot be attached to the smartphone 3.

In the exemplary embodiment, there are at least the above four differences between the smartphone 3 and the game apparatus 4. However, the two information processing apparatuses can be said to be information processing apparatuses of different types so long as there is at least one of the four differences. That is, in another exemplary embodiment, there may be at least one of the four differences between the two types of information processing apparatuses that are the terminal apparatuses in the information processing system. For example, the game apparatus 4 may not necessarily need to have the function of performing communication via a mobile communication network, or a dedicated game card may not necessarily need to be able to be attached to the game apparatus 4.

(Specific Example of Configuration of Server)

The server 1 includes one or more information processing apparatuses (i.e., server apparatuses), each including a processing section (e.g., a CPU) and a storage section (e.g., a memory). In the server 1, various types of information processing are performed by the CPU of the processing section executing an information processing program stored in the storage section of the server 1, using the memory. Further, the information processing apparatus includes a communication section for communicating with another apparatus via the network 2. The CPU connects to the network 2 using the communication section (in other words, via the communication section), thereby communicating with another apparatus (e.g., another server, the smartphone 3, the game apparatus 4, or the like).

It should be noted that in the present specification, a "server" means a single information processing apparatus (i.e., server apparatus), or if the function of the server is achieved by a plurality of server apparatuses, means the entirety of the group of the server apparatuses (i.e., a server system). That is, a "server" may be a server apparatus, or may be a server system. In the exemplary embodiment, the server 1 may include a single server apparatus, or may be configured to include a plurality of server apparatuses divided in accordance with the functions and/or the roles.

[3. Overview of Process Performed by Information Processing System]

(3-1: Overview of Point Management)

A description is given below of an overview of a processing action performed by the information processing system in the exemplary embodiment. As described above, the information processing system gives points in accordance with an action of the user regarding the terminal apparatus. Thus, first, with reference to FIGS. 4 and 5, a description is given of an overview of a point management method in the information processing system.

Figure 4:
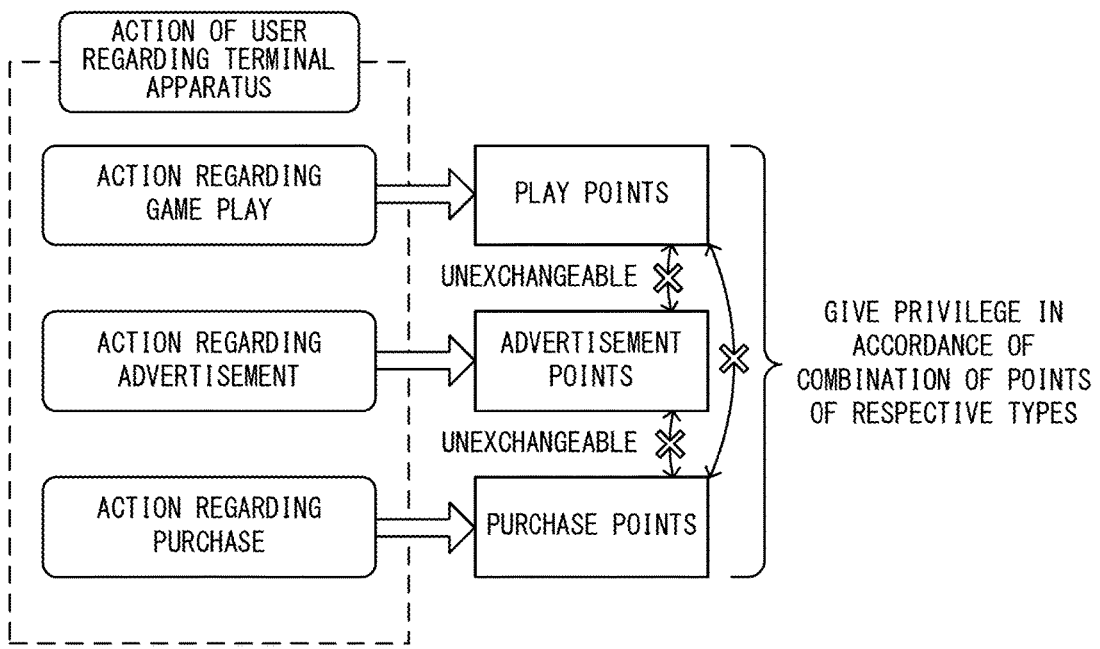
FIG. 4 is a diagram showing a non-limiting example of a point management method according to the exemplary embodiment.
Figure 5:
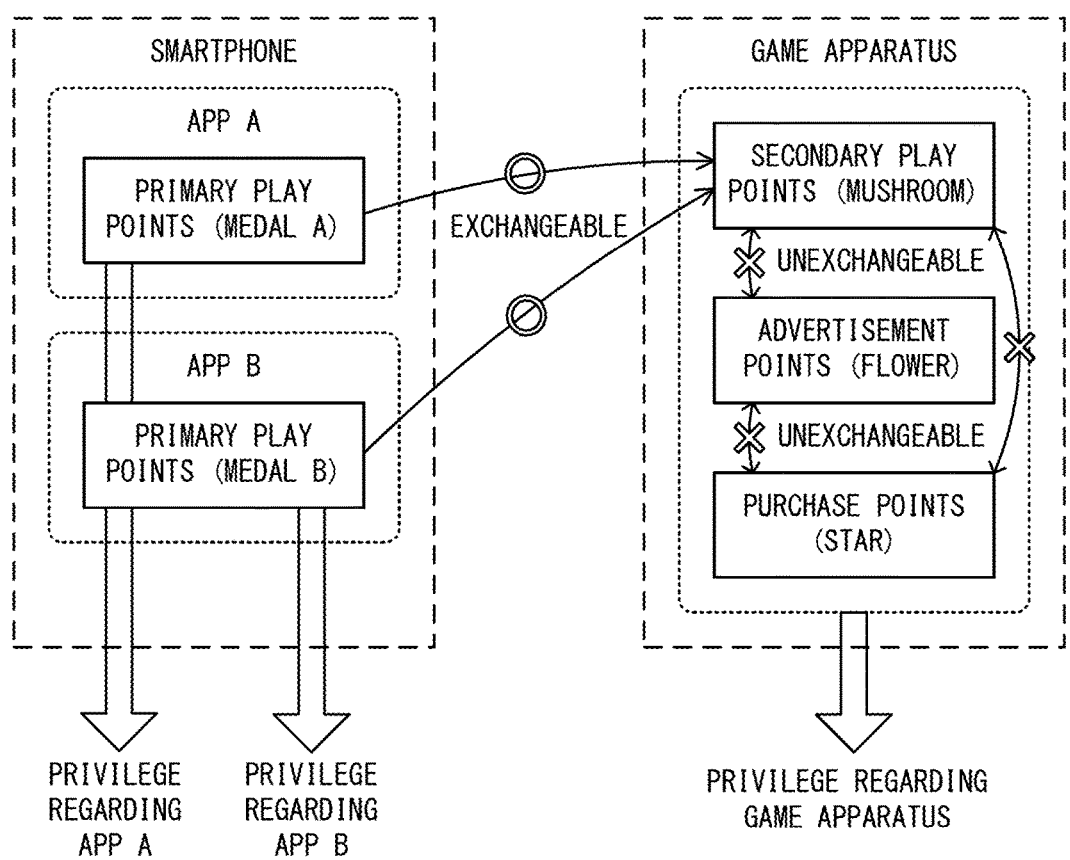
FIG. 5 is a diagram showing a non-limiting example of the point management method according to the exemplary embodiment.

FIGS. 4 and 5 are diagrams showing an example of the point management method in the exemplary embodiment. As shown in FIG. 4, in the exemplary embodiment, as an action of the user regarding the terminal apparatus, the server 1 gives points to the user in accordance with three types of actions. It should be noted that hereinafter, an action for which points are given (in accordance with the fact that the action is performed), i.e., an action for which the user can earn points, is referred to as a "point earning action". In accordance with the type of a point earning action, the server 1 gives points of different types. Specifically, in accordance with an action regarding game play, the server 1 gives play points. Further, in accordance with an action regarding an advertisement, the server 1 gives advertisement points. Further, in accordance with an action regarding a purchase, the server 1 gives purchase points.

The "action regarding game play" refers to an action regarding game play in a game application executed by the terminal apparatus. Examples of the above action include the action of satisfying a predetermined game condition in a game (a game operation). The game condition is any game condition, and for example, may be the following conditions.

A predetermined stage in the game is cleared

A particular item is acquired in the game

The play time of the game or the number of times the game is played reaches a predetermined amount or more A communication competition is performed Communication is performed with a friend set in an application (e.g., a message or game data is exchanged with the friend, or game play is performed cooperatively with the friend)

The "action regarding an advertisement" refers to an action regarding an advertisement performed using the terminal apparatus. Here, in the exemplary embodiment, the advertisement can be viewed in the terminal apparatus. The advertisement is, for example, an advertisement regarding the network service by the server 1, and specifically, is an advertisement regarding a product (e.g., an application) or a service provided in the network service, or an advertisement regarding an application executed in the network service. It should be noted that the content of the advertisement is any content. The advertisement is not limited to an advertisement regarding the above implementation provider, and may be an advertisement regarding another provider who is under a sponsorship contract with the implementation provider. Further, the advertisement is not limited to an advertisement regarding the network service, and may be an advertisement regarding a product or a service that is not provided in the network service.

The server 1 provides a promotional moving image regarding the product or the service for the terminal apparatus, or causes the terminal apparatus to display a banner advertisement regarding the product or the service, or transmits a notification regarding an advertisement to the terminal apparatus. For example, the "action regarding an advertisement" may be the following actions.

The action of viewing a promotional moving image in the terminal apparatus

The action of viewing a detailed advertisement page by performing the operation of selecting a banner advertisement The action of accessing a website provided by the server 1 (e.g., a website of the implementation provider), using the terminal apparatus The action of setting the terminal apparatus to receive a notification regarding an advertisement (e.g., the operation of, in response to an inquiry "Do you receive an announcement regarding this application?" when an application is installed, selecting "Yes")

The "action regarding a purchase" refers to the action of purchasing a product and/or a service in the network service by the server 1, the action performed using the terminal apparatus. Here, in the exemplary embodiment, the server 1 has the function of a shop server for providing a network service for selling data regarding a game apparatus app. The user can access the shop server using the smartphone 3 or the game apparatus 4 and purchase the data regarding the game apparatus app. It should be noted that the data regarding the game apparatus app may be program data of the game apparatus app, or may be data of an additional stage, a character, an item, or the like used in the game apparatus app. As described above, the "action regarding a purchase" in the exemplary embodiment is the action of purchasing the data regarding the game apparatus app using the terminal apparatus.

It should be noted that the product and/or the service sold in the network service are any product and/or service. For example, in another exemplary embodiment, data regarding a smartphone app may be sold. Further, the product may be not data used in the terminal apparatus, but an article. For example, the product may be a storage medium (e.g., a game cartridge) having stored data therein, or may be a merchandise related to an application (e.g., a merchandise of a game character), or may be a ticket to an event or a movie. Further, the product may be a product of another provider different from the above implementation provider (i.e., a product sold by agent in the network service). Further, the server 1 may provide a service for charging in accordance with the use of an application (i.e., a smartphone app or a game apparatus app). In this case, the "action regarding a purchase" may be the action of paying a fee for the use of the application.

It should be noted that in each of the above three types of actions, not only a single point earning action but also a plurality of point earning actions may be performed. For example, as the action regarding game play, the server 1 gives points in accordance with the fact that a predetermined stage in the game is cleared, and also gives points in accordance with the fact that the play time of the game reaches a predetermined time.

As described above, in the exemplary embodiment, in accordance with the above three types of actions, points of the above three types (i.e., play points, advertisement points, and purchase points) are given to the user. Here, in the exemplary embodiment, as shown in FIG. 4, the server 1 gives a privilege to the user in accordance with the combination of points of these types. For example, if the condition (a combination condition) "that 5 play points are accumulated, 3 advertisement points are accumulated, and 3 purchase points are accumulated" is satisfied, the user can acquire a privilege (in other words, can obtain the right to acquire the privilege). It should be noted that in the present specification, a condition for giving a privilege, which is determined using the combination of points of the above three types, is referred to as a "combination condition".

In addition, in the exemplary embodiment, the privilege that can be acquired in accordance with the combination of points of the above types is a privilege regarding the above game apparatus app. Specifically, the privilege is a coupon that can be used in the network service for selling the game apparatus app, which is provided by the server 1. Further, another privilege is data regarding the game apparatus app. That is, the privilege in the exemplary embodiment can be said to be a privilege regarding the game apparatus 4. It should be noted that the content of the privilege is any content. In another exemplary embodiment, the privilege may be data regarding a smartphone app, or may be a coupon that can be used to purchase the data regarding the smartphone app. Further, the privilege may be not data used in the terminal apparatus, but an article (e.g., a merchandise related to an application).

As described above, in the exemplary embodiment, the server 1 sets points of different types for a plurality of types of actions and gives a privilege to the user in accordance with the combination of points of these types. Consequently, the user performs each of the plurality of types of actions to obtain the privilege. Thus, the server 1 can provide the user with a motivation to perform various actions using the terminal apparatus. Further, this can increase the opportunities for the user to use a terminal apparatus, and increase the opportunities for the user to use the network service.

It should be noted that in the exemplary embodiment, as shown in FIG. 4, points of the three types cannot be exchanged for each other. That is, the server 1 does not permit the user to exchange (or convert) points of a certain type for points of another type. Thus, even if the user intensively performs a single type of particular action, it is difficult to obtain the privilege. To obtain the privilege, the user needs to perform each of the three types of actions. The exchange of points is thus prohibited, whereby it is possible to more certainly provide the user with a motivation to perform various actions.

(Difference Between Smartphone 3 and Game Apparatus 4 in Points)

As described above, in the exemplary embodiment, points are given in accordance with an action of the user regarding the terminal apparatus. Here, in the exemplary embodiment, an action of the user regarding the smartphone 3 is different from an action of the user regarding the game apparatus 4 in the method for giving points in accordance with the action. With reference to FIG. 5, a description is given below of the point giving methods in the smartphone 3 and the game apparatus 4.

First, to the game apparatus 4, as shown in FIG. 5, in accordance with the above three types of actions, points of different types are given. Further, to the game apparatus 4, the server 1 gives points of the same type, regardless of the game apparatus app executed for the point earning action (in other words, without distinguishing the game apparatus app). For example, play points given by executing a certain game apparatus app and play points given by executing another game apparatus app are treated as points of the same type. That is, in a case where 1 play point is given in accordance with the fact that a predetermined action is performed in the certain game apparatus app, and 2 play points are given in accordance with the fact that a predetermined action is performed in another game apparatus app, a total of 3 play points are given.

On the other hand, to the smartphone 3, the server 1 gives points (i.e., play points) in accordance with the action regarding game play in the above three types of actions. In the exemplary embodiment, points are not given in accordance with the action regarding an advertisement and the action regarding a purchase using the smartphone 3. In another exemplary embodiment, however, also to the smartphone 3, in accordance with the above three types of actions, points of the respective types may be given similarly to the game apparatus 4.

In addition, to the smartphone 3, the server 1 gives points of different types (here, play points) for respective smartphone apps executed for point earning actions. For example, in the example shown in FIG. 5, in a case where a point earning action is performed in a certain smartphone app A, play points regarding the smartphone app A are given. On the other hand, in a case where a point earning action is performed in a smartphone app B, which is different from the smartphone app A, play points regarding the smartphone app B are given. The "play points regarding the smartphone app A" and the "play points regarding the smartphone app B" are counted as points of different types.

Here, in the exemplary embodiment, play points given in accordance with an action of the user regarding the smartphone 3 can be exchanged for play points given in accordance with an action of the user regarding the game apparatus 4 (see FIG. 5). Thus, in the present specification, play points given in accordance with an action of the user regarding the smartphone 3 are referred to as "primary play points", and play points given in accordance with an action of the user regarding the game apparatus 4 are referred to as "secondary play points" (see FIG. 5).

It should be noted that in the exemplary embodiment, the server 1 exchanges primary play points for secondary play points, but does not permit the exchange of secondary play points for primary play points. Further, the server 1 does not permit the exchange of primary play points of a certain type for primary play points of another type. Here, if the above exchange of play points are permitted, only in order to acquire primary play points of a certain smartphone app, another smartphone app may be downloaded. At this time, an application that is not necessary for the user by rights may be installed on the smartphone 3, and the storage area of the smartphone 3 may be wastefully used. As described above, in the exemplary embodiment, to achieve efficient use of the storage area of the smartphone 3, secondary play points or primary play points are not allowed to be exchanged for primary play points of another type.

In the exemplary embodiment, primary play points and secondary play points are presented to the user as points of different types from each other. Specifically, primary play points are presented to the user as the number of medals set for each smartphone app. That is, medals indicating primary play points are treated as being different for each smartphone app. On the other hand, secondary play points are presented to the user as the number of mushrooms (see FIG. 9). Further, advertisement points are presented to the user as the number of flowers, and purchase points are presented to the user as the number of stars (see FIG. 9). It should be noted that hereinafter, points of three types including secondary play points, advertisement points, and purchase points will be occasionally referred to as "combination points".

As described above, in the exemplary embodiment, primary play points and secondary play points are points of different types from each other in appearance. In the exemplary embodiment, however, as described above, primary play points can be exchanged for secondary play points. Thus, primary play points and secondary play points can be said to be points of the same type. It should be noted that in another exemplary embodiment, primary play points and secondary play points may be presented to the user as points of the same type in appearance (see FIG. 15).

As described above, in the exemplary embodiment, the above secondary play points are used to determine the above combination condition, and primary play points are not directly used for the determination. As shown in FIG. 5, however, in the exemplary embodiment, in addition to giving a privilege in accordance with combination points of three types including secondary play points, the server 1 gives a privilege in accordance with primary play points. Here, regarding primary play points, the server 1 gives a privilege not in accordance with the combination condition regarding points of a plurality of types, but in accordance with a condition regarding primary play points of an individual type (i.e., primary play points of a single type) (referred to as an "individual condition"). For example, the individual condition is "that 10 primary play points (of a particular type) are accumulated".

In addition, a privilege given in accordance with primary play points is a privilege regarding a smartphone app corresponding to the primary play points (in other words, a smartphone app executed to acquire the primary play points). For example, in the example shown in FIG. 5, a privilege given in accordance with primary play points that can be acquired in the smartphone app A is data regarding the smartphone app A (i.e., data that can be used in the smartphone app A, for example, data of an additional stage, a character, an item, or the like). Further, a privilege given in accordance with primary play points that can be acquired in the smartphone app B is data regarding the smartphone app B.

As described above, in the exemplary embodiment, in the smartphone 3 and the game apparatus 4, points are given in accordance with an action of the user regarding each terminal apparatus. That is, the user can accumulate points by an action using each terminal apparatus.

In addition, in the exemplary embodiment, the user can also acquire a privilege regarding the game apparatus 4, using primary play points given in accordance with an action in the smartphone 3 (by exchanging primary play points for secondary play points). Consequently, it is possible to provide the user using the smartphone 3 with a motivation to use the game apparatus 4.

(3-2: Overview of Point Management Process)
Next, with reference to FIGS. 6 to 12, a description is given of an overview of the process of managing points, which is performed by the information processing system.

Figure 6:
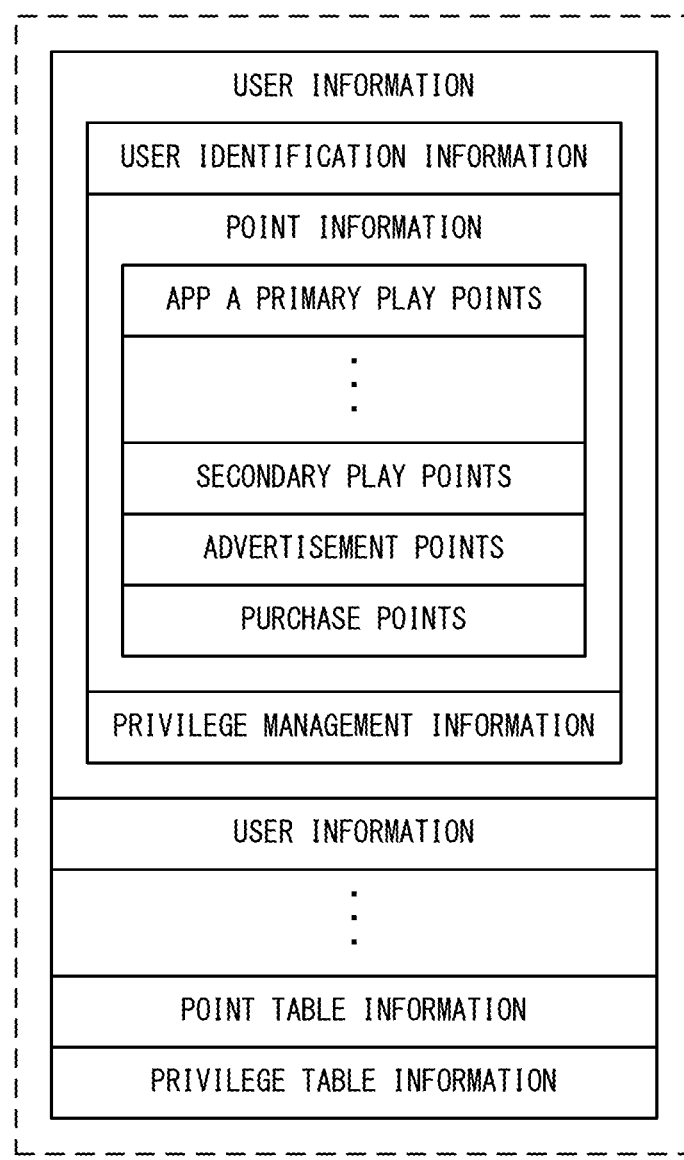
FIG. 6 is a diagram showing a non-limiting example of data stored in a storage section of a server.

(Data Stored in Server)
FIG. 6 is a diagram showing an example of data stored in the storage section of the server 1. As shown in FIG. 6, the server 1 stores, with respect to each user in the storage section (e.g., a memory or the like), user information regarding the user in the network service. The user information includes user identification information. The user identification information is identification information for identifying the user indicated by the user information. The user identification information may be an ID of the user (i.e., an ID of an account of the user) in the network service. Further, the user identification information may include information of a password for logging into the network service using the ID. Further, in another exemplary embodiment, the user identification information may be identification information for identifying one or more terminal apparatuses owned by the user.

In addition, the user information includes point information. The point information indicates the numerical value of points (referred to as "the number of points") given to the user indicated by the user information. More specifically, the point information indicates the number of points that are currently accumulated (in other words, currently owned by the user). Further, the point information indicates the numbers of points of the plurality of types described above. That is, in the exemplary embodiment, the point information indicates the numbers of primary play points, secondary play points, advertisement points, and purchase points of each smartphone app (see FIG. 6). In the exemplary embodiment, points are given in accordance with an action of the user. Thus, the point information can be said to be information indicating the numerical value corresponding to the history of an action of the user.

In addition, the user information includes privilege management information. The privilege management information indicates a privilege acquired by the user indicated by the user information. It should be noted that in a case where the privilege is the above coupon, the privilege management information may include information indicating whether or not the coupon acquired by the user has already been used.

As shown in FIG. 6, the server 1 stores point table information. Although the details will be described later, the point table information indicates a point table for calculating points to be given based on action information (see FIG. 8).

In addition, the server 1 stores privilege table information. Although the details will be described later, the privilege table information indicates a privilege table for identifying a privilege that can be given to the user based on the combination points of the above three types (see FIG. 11).

Figure 7:
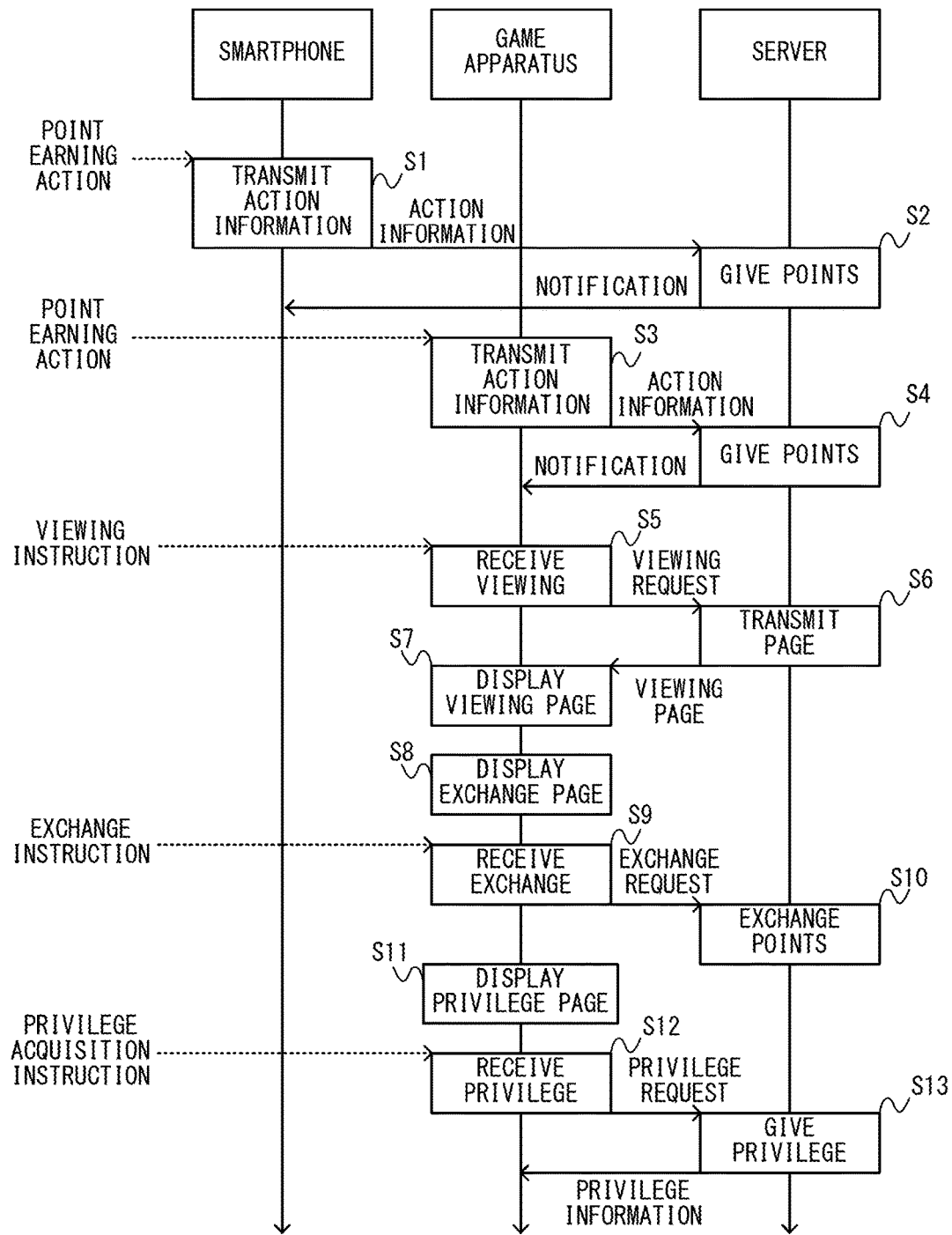
FIG. 7 is a diagram showing a non-limiting example of an action performed by the information processing system.

(Example of Action)
FIG. 7 is a diagram showing an example of an action performed by the information processing system. In FIG. 7, first, in the smartphone 3, an action of the user is detected, and action information is transmitted to the server 1 (step S1). That is, if the user performs a point earning action, the smartphone 3 generates action information indicating the action and transmits the action information to the server 1. It should be noted that in the exemplary embodiment, the point earning action detected by the smartphone 3 is the above action regarding game play. In the exemplary embodiment, the above action information includes information indicating an application in which the action is performed (e.g., identification information for identifying the application) and information indicating the performed action (e.g., the clearing of a stage, the acquisition of an item, or the like).

It should be noted that the action information may be any information that allows the identification of the action of the user regarding the terminal apparatus. For example, in a case where the action indicated by the action information is an action based on communication between the terminal apparatus and the server (e.g., an online competition with another terminal, the purchase of a product in the shop server, or the like), information to be transmitted from the terminal apparatus to the server 1 in the communication may function as the action information. That is, in the above case, the action information may be information to be transmitted from the terminal apparatus to the server 1 in the communication. In other words, the server 1 may treat, as the action information, information transmitted from the terminal apparatus in the communication. For example, action information indicating an action "an online competition with another terminal" may be information to be transmitted to the game server included in the server 1 and indicating a request for an online competition. Further, for example, action information indicating an action "the purchase of a product" may be information to be transmitted to the shop server included in the server 1 and indicating that a product is to be purchased.

In addition, in a case where the server 1 includes a server for managing points (referred to as a "point management server") and another server (e.g., the shop server and/or the game server), the action information may be transmitted from the terminal apparatus to the point management server via another server. For example, regarding play points, the action information (e.g., information indicating a predetermined game operation) may be transmitted from the terminal apparatus to the game server, and the game server may transmit the action information to the point management server. Further, for example, regarding purchase points, the action information (e.g., information indicating that a product is to be purchased) may be transmitted from the terminal apparatus to the shop server, and the shop server may transmit the action information to the point management server.

In addition, in the exemplary embodiment, information transmitted from the terminal apparatus to the server 1 includes identification information of the user. This enables the server 1 having received the information from the terminal apparatus to identify the user corresponding to the information. It should be noted that in a series of processes shown in FIG. 7, it is assumed that information transmitted from the smartphone 3 to the server 1 and information transmitted from the game apparatus 4 to the server 1 include user identification information indicating the same user. It should be noted that in a case where the server 1 stores information associating identification information of the user with identification information of the terminal apparatus, the information transmitted from the terminal apparatus to the server 1 may include identification information of the terminal apparatus, instead of the identification information of the user. This also enables the server 1 to identify the user corresponding to the information from the terminal apparatus.

It should be noted that the function of generating and transmitting action information, which is performed by the smartphone 3, may be a function installed in advance on the smartphone 3 (e.g., a function by the OS), or may be a function by an application that is being executed.

If receiving the action information from the smartphone 3, then based on the received action information, the server 1 gives points to the user (step S2). That is, in accordance with the action indicated by the received action information, the smartphone 3 identifies the contents of points to be given (i.e., the type of points to be given and the number of points to be given), and in accordance with the identified contents, updates point information regarding the user corresponding to the action information. Here, the contents of points to be given are identified using the above point table.

FIG. 8 is a diagram showing an example of the point table. As shown in FIG. 8, the point table is a table for associating the content of an action performed by the user with the content of points to be given in accordance with the action (i.e., a given point content). For example, in the example of the point table shown in FIG. 8, an action "clearing a stage in the application A" is associated with the giving of 2 primary play points in the application A. It should be noted that as shown in FIG. 8, the point table includes the content of an action indicating an action of the user regarding the smartphone 3 and the content of an action indicating an action of the user regarding the game apparatus 4, and includes the contents of actions regarding the above three types of actions. Further, the point table includes given point contents regarding points of the above various types (including primary play points for each smartphone app).

The server 1 identifies, from the contents of actions included in the point table, the content of an action that matches the action indicated by the received action information. Then, the server 1 identifies a given point content associated with the identified content of the action. Then, the server 1 gives points to the user in accordance with the identified given point content.

The server 1 updates the point information included in the user information, thereby giving points to the user. Specifically, in accordance with the given point content identified using the point table, the server 1 updates the number of points indicated by the point information. For example, if a given point content "giving 2 primary play points in the application A" is identified in the state where the point information indicates that primary play points in the application A are 4 points, the point information is updated so that the primary play points indicate 6 points. It should be noted that the point information to be updated is the point information regarding the user corresponding to the action information received by the server 1, that is, the point information included in the user information regarding the user indicated by the user identification information included in the action information received by the server 1. The server 1 stores the updated point information.

It should be noted that if giving points, the server 1 may transmit to the smartphone 3 a notification that points are given (see FIG. 7). Further, in accordance with the fact that the action information is transmitted to the server 1, or in accordance with the fact that the notification is received from the server 1, the smartphone 3 may present, to the user, information indicating the number of given points. For example, in a case where a point earning action is performed while a certain smartphone app is being executed, whereby primary play points in the smartphone app are given, the smartphone 3 may display the above number of primary play points accumulated in the smartphone app (i.e., in an image generated by the smartphone app). As described above, in the exemplary embodiment, primary play points are presented as the number of medals to the user. Thus, the number of these medals may be displayed in the smartphone app. Further, the number of points may be displayed not only in a smartphone app but also on a menu screen of the smartphone 3 (specifically, on a menu screen generated by the OS of the smartphone 3).

In addition, also in the game apparatus 4, similarly to the smartphone 3, an action of the user is detected by the game apparatus 4, and action information is transmitted to the server 1 (step S3). That is, if the user performs a point earning action, the game apparatus 4 generates action information indicating the action and transmits the action information to the server 1.

It should be noted that in the exemplary embodiment, the point earning action detected by the game apparatus 4 is the above three types of actions (see FIG. 4). Here, similarly to the action information in the smartphone 3, action information indicating the action regarding game play includes information indicating an application in which the action is performed and information indicating the performed action. It should be noted that in the exemplary embodiment, as described above, to the game apparatus 4, points of the same type (i.e., secondary play points) are given without distinguishing the application. Thus, the action information transmitted from the game apparatus 4 may not include information indicating the application.

In addition, for example, action information indicating the action regarding an advertisement may be information indicating a viewed advertisement (e.g., identification information attached to the advertisement), or may be information indicating the content of a setting in the game apparatus 4 regarding the advertisement (e.g., information indicating that a setting is made so that an announcement from the network service is to be received). Further, action information indicating the action regarding a purchase may be information indicating a purchased product and/or a purchased service (e.g., identification information attached to the product and/or the service), or may be information indicating the purchased price.

It should be noted that the function of generating and transmitting action information, which is performed by the game apparatus 4, may be a function installed in advance on the game apparatus 4 (e.g., a function by the OS), or may be a function by an application that is being executed. In the second case (i.e., a function by an application that is being executed), for example, a predetermined game application executed by the game apparatus 4 may have the function of transmitting action information indicating the action regarding game play. Further, an application for viewing an advertisement (e.g., a moving image reproduction application) may have the function of transmitting action information indicating the action regarding an advertisement. Further, an application for purchasing a product and/or a service in a shopping site by the shop server may have the function of transmitting the action regarding a purchase.

If receiving the action information from the game apparatus 4, then based on the received action information, the server 1 gives points to the user (step S4). The process of the server 1 in step S4 is similar to the process in the above step S2. In the process of step S4, however, the received action information indicates an action of the user regarding the game apparatus 4. Thus, any of secondary play points, advertisement points, and purchase points are given to the user.

It should be noted that also in the process of step S4, similarly to the process of step S2, the server 1 may transmit to the game apparatus 4 a notification that points are given (see FIG. 7). Further, in accordance with the fact that the action information is transmitted to the server 1, or in accordance with the fact that the notification is received from the server 1, the game apparatus 4 may present, to the user, information indicating the number of given points. For example, in a case where a point earning action is performed while a certain game apparatus app is being executed, whereby points (specifically, any of the combination points of the above three types) are given, the game apparatus 4 may display the number of the accumulated points in the game apparatus app (i.e., in an image generated by the game apparatus app). Further, the number of points may be displayed not only in a game apparatus app but also on a menu screen of the game apparatus 4 (specifically, on a menu screen generated by the OS of the game apparatus 4).

It should be noted that in FIG. 7, as an example, a case has been described where action information is transmitted from the smartphone 3, and then, action information is transmitted from the game apparatus 4. However, action information is transmitted from each terminal apparatus (the smartphone 3 and the game apparatus 4) at any timing. Actually, in accordance with the fact that a point earning action is performed in each terminal apparatus, action information is sequentially transmitted to the server 1.

In addition, in the exemplary embodiment, the user can view points given to the user themselves, exchange points (i.e., exchange primary play points for secondary play points), and acquire a privilege (i.e., exchange the combination points of the above three types for a privilege) by accessing the server 1 using the terminal apparatus. In the exemplary embodiment, it is assumed that the user can perform these operations using either of the smartphone 3 and the game apparatus 4. In FIG. 7, as an example, a case is described where these operations are performed using the game apparatus 4. It should be noted that in a case where these operations are performed using the smartphone 3, the smartphone 3 performs the processes of the game apparatus 4 described later (steps S5, S7-S9, S11, and S12), similarly to the game apparatus 4.

First, the game apparatus 4 receives from the user a viewing instruction to view points, and in accordance with the viewing instruction, makes a viewing request to the server 1 (step S5). That is, the game apparatus 4 transmits information of the viewing request to the server 1. For example, the viewing request may be made by a browser application executed by the game apparatus 4, or may be made by various applications (e.g., a game application or the like) in which a point earning action is performed.

In addition, under the condition that the game apparatus 4 is logged in a service system provided by the server 1, the game apparatus 4 may make the viewing request. That is, the user may first perform the operation of logging into the service system, and after the login is performed, give the viewing instruction.

In accordance with the viewing request, the server 1 transmits a viewing page regarding the user to the game apparatus 4 (step S6). In the process of step S6, first, the server 1 identifies the number of points given to the user according to the viewing request. Specifically, the server 1 reads, from the storage section, point information regarding the user indicated by user identification information included in information of the viewing request and identifies the number of the combination points of the above three types given to the user. Then, the server 1 generates a viewing page representing the identified number of points. It should be noted that in the exemplary embodiment, a viewing page is a web page and is transmitted from the server 1 to the game apparatus 4. The game apparatus 4 displays the received viewing page on the display section 28 (step S7).

Figure 9:
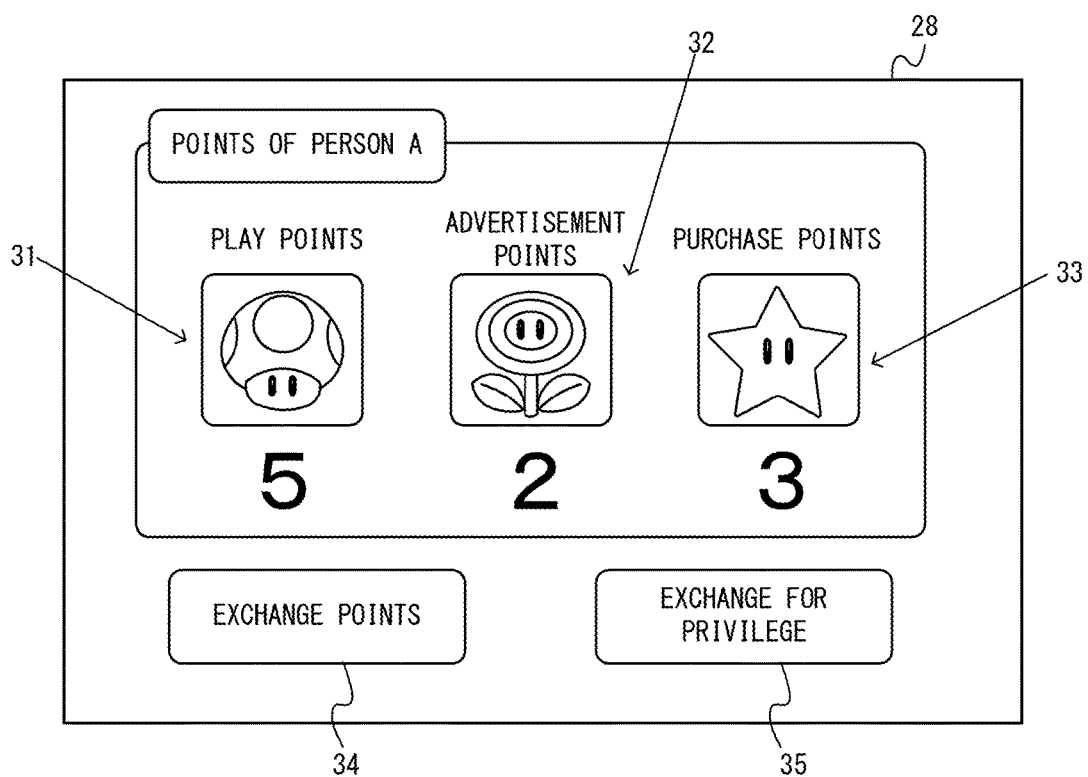
FIG. 9 is a diagram showing a non-limiting example of a viewing page displayed on the game apparatus.

FIG. 9 is a diagram showing an example of the viewing page displayed in the game apparatus 4. As shown in FIG. 9, the viewing page includes a play point image 31, an advertisement point image 32, and a purchase point image 33. The play point image 31 represents the number of secondary play points given to the user (in other words, the number of accumulated points). The advertisement point image 32 represents the number of advertisement points given to the user. The purchase point image 33 represents the number of purchase points given to the user. As described above, in the exemplary embodiment, to present combination points of the three types to the user by distinguishing these three types in an easily understandable manner, play points are represented by an image of a mushroom, advertisement points are represented by an image of a flower, and purchase points are represented by an image of a star (see FIG. 9).

It should be noted that in another exemplary embodiment, the viewing page may include an image representing the number of primary play points of each smartphone app. Further, the viewing page may include an image representing history indicating the date and time when points of each type are acquired and the contents of points of each type (i.e., the action of acquiring points, and an application in which the action is performed). It should be noted that the viewing page may include an image for displaying a page representing the history (e.g., a link image), instead of an image representing the history. Further, in another exemplary embodiment, in a case where advertisement points and/or purchase points are given in accordance with an action regarding the smartphone 3, the viewing page may include images representing these advertisement points and/or purchase points.

In addition, in another exemplary embodiment, the server 1 may generate a viewing page corresponding to the terminal apparatus having made a viewing request. That is, in a case where a viewing request is made by the smartphone 3, the server 1 may generate a viewing page including an image representing primary play points. In a case where a viewing request is made by the game apparatus 4, the server 1 may generate a viewing page not including an image representing primary play points.

Further, the server 1 may generate a viewing page corresponding to an application in which a viewing request is made. That is, in a case where a viewing request is made in a certain smartphone app A (i.e., in a case where a viewing instruction is received in the smartphone app A, and a viewing page is displayed in the smartphone app A), the server 1 may generate a viewing page including an image representing primary play points in the smartphone app A. In a case where a viewing request is made in a smartphone app B, the server 1 may generate a viewing page including an image representing primary play points in the smartphone app B.

In addition, the game apparatus 4 acquires a point exchange page from the server 1 and displays the point exchange page (step S8). The point exchange page is a page (specifically, a web page) on which the user exchanges points (i.e., exchanges primary play points for secondary play points). Here, in the exemplary embodiment, the viewing page includes an exchange page display button 34 for displaying a point exchange page (see FIG. 9). In accordance with the fact that the user performs the operation of specifying the exchange page display button 34, the game apparatus 4 makes a request to acquire a point exchange page to the server 1. In accordance with the request, the server 1 generates a point exchange page and transmits the point exchange page to the game apparatus 4. It should be noted that the method in which the game apparatus 4 acquires a point exchange page is any method. For example, in another exemplary embodiment, in accordance with a predetermined instruction given by the user, the game apparatus 4 may directly acquire a point exchange page (i.e., not through the viewing page). For example, the game apparatus 4 may receive the predetermined instruction in a game apparatus app that is being executed.

Figure 10:
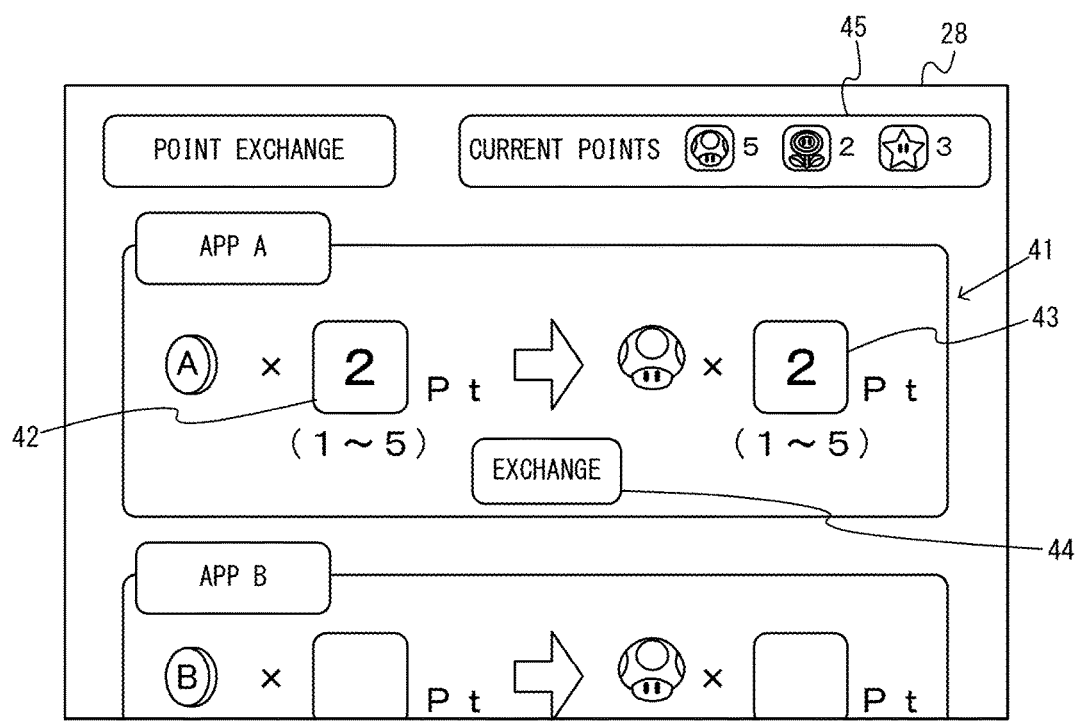
FIG. 10 is a diagram showing a non-limiting example of a point exchange page.

FIG. 10 is a diagram showing an example of the point exchange page. As shown in FIG. 10, the point exchange page includes an exchange input image 41. It should be noted that the exchange input image is provided for each smartphone app. In FIG. 10, a part of the point exchange page including a plurality of exchange input images is displayed on the display section 28, and the point exchange page is displayed by being scrolled in accordance with an operation of the user.

The exchange input image 41 indicates an image representing the number of primary play points in a smartphone app (an image representing the number of medals in FIG. 10), and the number of secondary play points that can be exchanged for primary play points having the above number of points (the number of mushrooms in FIG. 10). Specifically, in FIG. 10, the exchange input image 41 includes a number-of-points input field 42 and a number-of-points output field 43. The number-of-points input field 42 is an input field for inputting the number of primary play points to be exchanged. The number-of-points output field 43 is an output field for outputting the number of secondary play points to be exchanged for the number of points input to the number-of-points input field 42. In the exemplary embodiment, if the user inputs the number of points to the number-of-points input field 42, the terminal apparatus displays in the number-of-points output field 43 the number of secondary play points to be exchanged for the input number of points. It should be noted that the example of FIG. 10 shows the state where as a result of inputting "2" in the number-of-points input field 42, "2" is output to the number-of-points output field 43. It should be noted that here, it is assumed that a single medal can be exchanged for a single mushroom.

In addition, in the exemplary embodiment, the exchange input image 41 includes, below the number-of-points input field 42, an image representing the range of primary play points that can be exchanged ("1 to 5" in FIG. 10), and includes, below the number-of-points output field 43, an image representing the range of secondary play points that can be exchanged ("1 to 5" in FIG. 10). With these images, the user can know the exchange rate between primary play points and secondary play points. It should be noted that the example of FIG. 10 shows the state where the user owns 5 medals for the smartphone app A and can exchange these 5 medals to 1 to 5 mushrooms.

In addition, the exchange input image 41 includes a point exchange button 44. The point exchange button 44 is a button for giving a point exchange instruction. In the state where the number of primary play points is input to the number-of-points input field 42, and the number of secondary play points is displayed in the number-of-points output field 43, the user specifies the point exchange button 44, thereby giving a point exchange instruction. It should be noted that the exchange input image shown in FIG. 10 is an example. The method for causing the user to provide an input to specify the content of the exchange of points on the point exchange page is any method.

In addition, the point exchange page includes an owned-points image 45. The owned-points image 45 represents the numbers of the combination points of the above three types owned by the user. With the owned-points image 45, the user can confirm the numbers of points owned by the user themselves when exchanging points.

It should be noted that the server 1 generates the point exchange page based on point information regarding the user. That is, based on point information, the server 1 identifies the number of points of each type (including primary play points) included in the point exchange page. This point information is point information regarding the user indicated by user identification information included in information indicating the request to acquire a point exchange page.

If receiving the point exchange instruction from the user, the game apparatus 4 makes a point exchange request to the server 1 (step S9 shown in FIG. 7). That is, the game apparatus 4 transmits information of the point exchange request to the server 1. This information of the point exchange request includes information indicating the type of primary play points as a target of exchange (e.g., identification information of a smartphone app corresponding to primary play points), and information indicating the number of points to be exchanged (e.g., the number of primary play points or the number of secondary play points).

Receiving the information of the point exchange request, the server 1 exchanges points in accordance with the request (step S10). That is, in accordance with the point exchange request, the server 1 makes a subtraction from primary play points regarding the user having made the request and increases secondary play points, thereby updating point information of the user. Specifically, in accordance with the number of points indicated by the information, a subtraction is made from the primary play points indicated by the information of the point exchange request. Further, an addition is made to secondary play points in accordance with the number of points indicated by the information of the point exchange request.

It should be noted that the server 1 may perform an exchange process in the process of step S10 and then transmit to the game apparatus 4 a page representing points of each type after the exchange. For example, the server 1 may transmit to the game apparatus 4 a web page similar to the viewing page as a page representing points of each type after the exchange. The game apparatus 4 displays on the display section 28 the page received from the server 1. This enables the server 1 to present points of each type after the exchange to the user.

In addition, the game apparatus 4 acquires a privilege page from the server 1 and displays the privilege page (step S11). The privilege page is a page (specifically, a web page) on which the user acquires a privilege (i.e., exchanges points for a privilege). Here, in the exemplary embodiment, the viewing page includes a privilege page display button 35 for displaying a privilege page (see FIG. 9). In accordance with the fact that the user performs the operation of specifying the privilege page display button 35, the game apparatus 4 makes a request to acquire a privilege page to the server 1. In accordance with the request, the server 1 generates a privilege page and transmits the privilege page to the game apparatus 4. It should be noted that the method in which the game apparatus 4 acquires a privilege page is any method. For example, in another exemplary embodiment, in accordance with a predetermined instruction given by the user, the game apparatus 4 may directly acquire a privilege page (i.e., not through the viewing page). For example, the game apparatus 4 may receive the predetermined instruction in a game apparatus app that is being executed.

Figure 11:
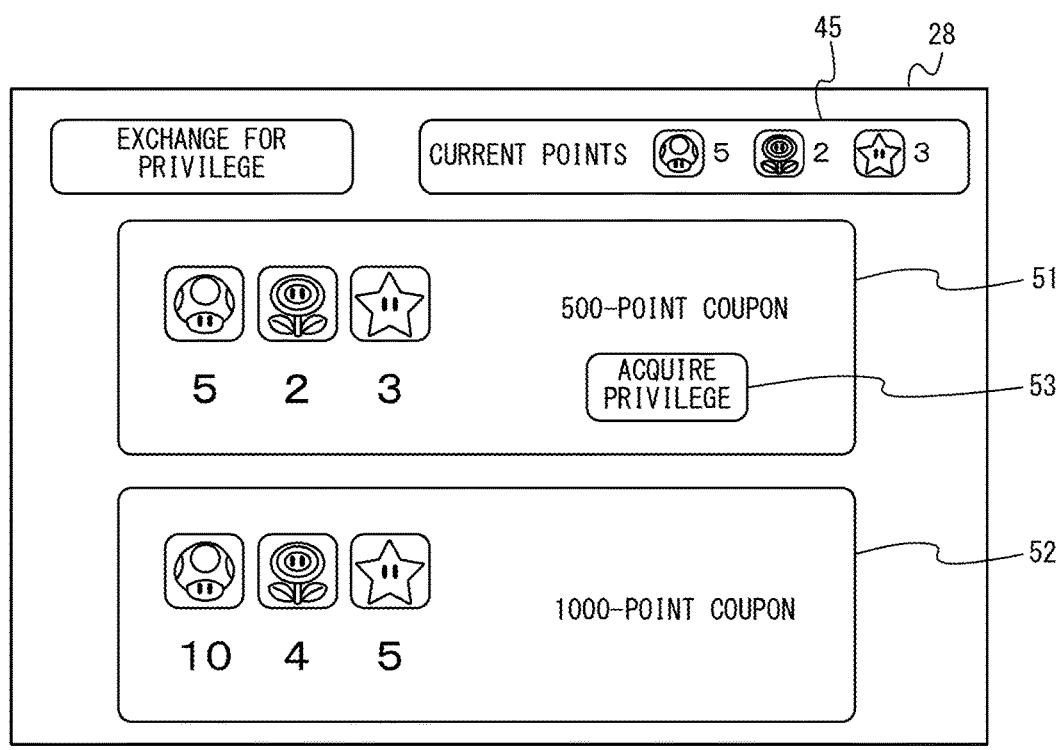
FIG. 11 is a diagram showing a non-limiting example of a privilege page.

FIG. 11 is a diagram showing an example of the privilege page. As shown in FIG. 11, the privilege page includes privilege specifying images 51 and 52. It should be noted that in the exemplary embodiment, there are a plurality of types of privileges that can be acquired by the user, and a privilege specifying image is provided for each privilege. In FIG. 11, a part of the privilege page including a plurality of privilege specifying images is displayed on the display section 28, and the privilege page is displayed by being scrolled in accordance with an operation of the user. It should be noted that the privilege page includes owned-points image 45, which represents a set of the numbers of points currently owned by the user, similarly to the point exchange page.

The privilege specifying image represents the combination of the numbers of the combination points of the above three types (e.g., the combination of "mushroom: 5, flower: 2, star: 3" in the privilege specifying image 51 shown in FIG. 11), and a privilege that can be acquired in exchange for the points of the combination (e.g., "500-point coupon" in the privilege specifying image 51 shown in FIG. 11). The above combination is the combination of points required to acquire a privilege and is the above combination condition.

In addition, in a case where the combination condition represented by the privilege specifying image is satisfied by points owned by the user, the privilege specifying image includes a privilege acquisition button 53. For example, in the example shown in FIG. 11, the set of the numbers of current points represented by the owned-points image 45 satisfies the combination condition represented by the privilege specifying image 51. Thus, the privilege specifying image 51 is generated so as to include the privilege acquisition button 53. On the other hand, the set of the numbers of current points represented by the owned-points image 45 does not satisfy the combination condition represented by the privilege specifying image 52. Thus, the privilege specifying image 52 does not include a privilege acquisition button. As described above, the privilege page includes information (i.e., the privilege acquisition button 53) indicating whether or not the combination condition is satisfied (in other words, whether or not a privilege can be acquired).

The privilege acquisition button 53 is a button for giving a privilege acquisition instruction. The user specifies a privilege acquisition button included in a privilege specifying image representing a privilege to be acquired, thereby giving a privilege acquisition instruction.

It should be noted that based on the privilege table information stored in the storage section, the server 1 generates a privilege page including the privilege specifying image. FIG. 12 is a diagram showing an example of the privilege table. As shown in FIG. 12, the privilege table is a table for associating the combination condition regarding the combination points of the above three types with a privilege that can be acquired by the user when the combination condition is satisfied. Based on the combination indicated by the combination condition in the privilege table (specifically, the combination of points of the above three types) and a privilege associated with the combination condition, the server 1 determines the combination of points and a privilege in the privilege specifying image. It should be noted that the server 1 may not generate a privilege specifying image for all the combination conditions included in the privilege table. For example, the server 1 may generate a privilege specifying image for a combination condition corresponding to a privilege that can be acquired by the user (in other words, a combination condition satisfied by points owned by the user), and transmit a privilege page including the generated privilege specifying image to the game apparatus 4.

The combination condition may be a condition regarding the combination of points of a plurality of types, and is not limited to the condition shown in FIG. 12. For example, the combination condition may be a condition in which minimum values are set for some of points of a plurality of types, and a total value of points of the respective types is set. Specifically, the combination condition may be "that purchase points are 5 points, and the total value of the combination points of the three types is 20 points. Further, the privilege table may include a condition regarding the combination of points of two types among the above three types, or may include a condition regarding points of a single type.

If receiving the privilege acquisition instruction from the user, the game apparatus 4 makes a privilege acquisition request to the server 1 (step S12 shown in FIG. 7). That is, the game apparatus 4 transmits information of the privilege acquisition request to the server 1. This information of the privilege acquisition request includes information indicating a privilege to be acquired (e.g., identification information set for a privilege).

Receiving the information of the privilege acquisition request, the server 1 gives a privilege to the user in accordance with the request (step S13). That is, the server 1 transmits, to the game apparatus 4, privilege information regarding a privilege to be given. Further, in accordance with the privilege to be given, the server 1 updates the privilege management information stored in the storage section (specifically, the privilege management information included in the user information regarding the user to which the privilege is to be given). Specifically, the privilege management information is updated by adding information indicating the privilege to be given. Further, the server 1 makes a subtraction from the number of points of each type owned by the user, in exchange for the privilege to be given, thereby updating the point information regarding the user.

It should be noted that the content of the privilege to be given to the user is any content. In the exemplary embodiment, the privilege is the above coupon or data regarding the game apparatus 4. If the privilege to be given is a coupon, the server 1 transmits, to the game apparatus 4, privilege information indicating a notification that a coupon is to be given. The game apparatus 4 having received the privilege information presents to the user the notification indicated by the privilege information (e.g., displays a notification image on the display section 28). Further, the privilege information may be data of a web page indicating a list of privileges acquired by the user.

In addition, the server 1 adds information indicating the coupon (e.g., identification information of the coupon or information indicating the content of a discount by the coupon), thereby updating the privilege management information. The fact that the coupon is thus given to the user is managed by the server 1. Thus, if the user accesses a shopping site of the server 1 after the coupon is given, the user can use the coupon. It should be noted that if the coupon is used, the server 1 adds information indicating that the coupon has already been used, thereby updating the privilege management information.

In addition, if the privilege to be given is data regarding the game apparatus 4, the server 1 transmits the data as privilege information to the game apparatus 4. The game apparatus 4 stores the received data in the storage section (e.g., a memory). This enables the data to be used in a predetermined application executed by the game apparatus 4. That is, the game apparatus 4 performs a process using the data (e.g., game processing) in a predetermined application.

It should be noted that a terminal apparatus as the transmission destination of privilege information may be a terminal apparatus different from a terminal apparatus having made a privilege request. For example, in a case where the smartphone 3 makes a privilege request, the server 1 may transmit privilege information to the game apparatus 4 (e.g., a game apparatus for using data as a privilege). Based on this, the user can give a privilege acquisition instruction using a terminal apparatus other than a terminal apparatus for using a privilege, which is convenient for the user. Further, for example, the server 1 can transmit privilege information to a terminal apparatus for using a privilege, which is convenient for the user. It should be noted that the server 1 stores, in advance, terminal identification information for identifying the game apparatus 4 as the transmission destination of privilege information. Based on the terminal identification information stored in the storage section, the server 1 identifies a terminal apparatus as the transmission destination of the privilege information. For example, the terminal identification information may be information associating the above user identification information with identification information of a game apparatus.

In addition, a privilege that can be acquired by the combination points of the three types has been described above. In the exemplary embodiment, the server 1 also gives the user a privilege that can be acquired using primary play points. By a process similar to that of a privilege that can be acquired by the combination points, the server 1 transmits, to the terminal apparatus (specifically, the smartphone 3), also privilege information of a privilege that can be acquired using primary play points. It should be noted that as described above, a privilege that can be acquired using primary play points can be acquired not under the combination condition, but under the condition that the above individual condition is satisfied. Further, privilege information regarding a privilege that can be acquired using primary play points is data regarding a smartphone app corresponding to the primary play points.

It should be noted that in another exemplary embodiment, the server 1 may transmit privilege information to the terminal apparatus by push transmission. For example, in the process of step S2 or S4, the server 1 determines whether or not the combination condition is satisfied, and if the combination condition is satisfied, the server 1 may transmit, to the terminal apparatus by push transmission, privilege information indicating that the combination condition is satisfied (in other words, that a privilege can be given). Further, at this time, the server 1 may store, in advance, transmission destination information indicating a terminal apparatus as the transmission destination of privilege information for each user, and based on the transmission destination information, identify a terminal apparatus to which to transmit the privilege information. For example, the transmission destination information may be included in the user information shown in FIG. 6. The server 1 may identify a user (in other words, user information) corresponding to action information satisfying the combination condition, and based on the transmission destination information regarding the identified user, further identify a terminal apparatus as the transmission destination of the privilege information.

Here, in the present specification, the push transmission means not only a communication method for actually transmitting information by push, but also a communication method for giving the user an impression that information is transmitted by push in appearance. That is, in the present specification, the "push transmission" (or "push distribution"; in the present specification, "push distribution" means not only the form in which information is transmitted to a plurality of apparatuses, but also the form in which information is transmitted to a single apparatus) refers to a communication method for, regardless of the presence or absence of a user instruction to transmit information, automatically transmitting the information to a transmission destination. Thus, in the present specification, the form in which even without a request from a terminal apparatus, the server 1 transmits information to the terminal apparatus, and the form in which regardless of the presence or absence of the above user instruction, a terminal apparatus transmits a request to the server 1, and in accordance with the request, the server 1 transmits information to the terminal apparatus are also referred to as "push transmission".

[4. Specific Example of Process Performed by Each Apparatus]

Figure 13:
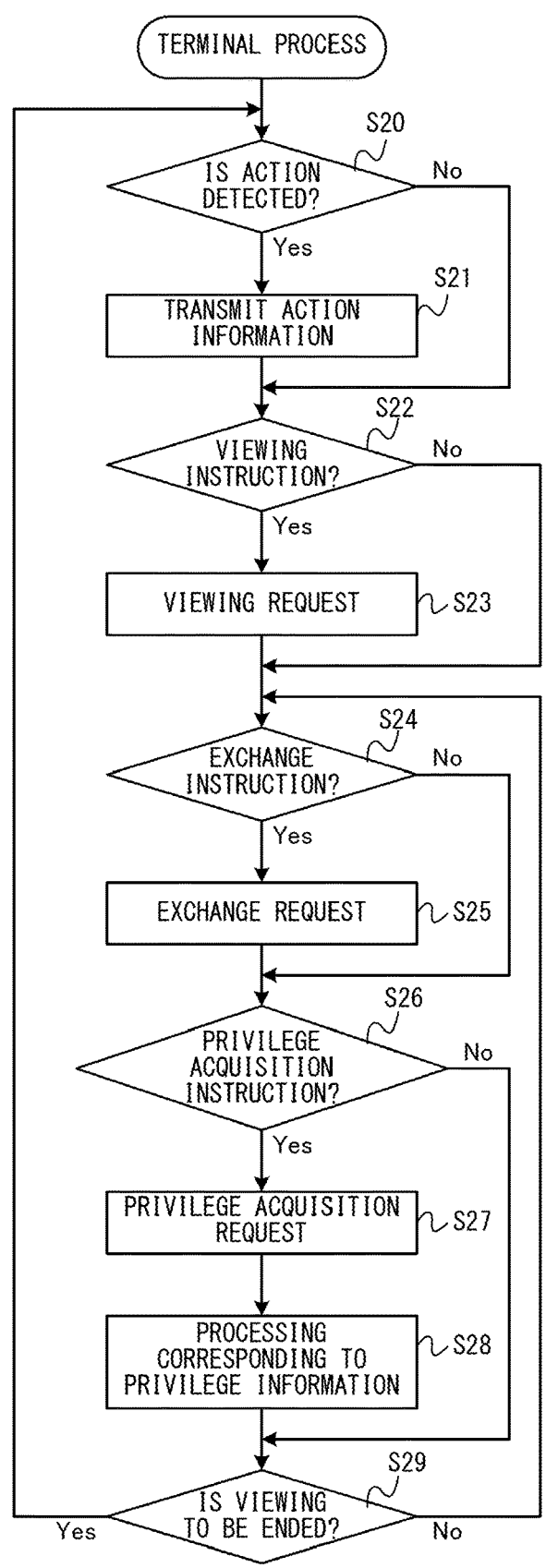
FIG. 13 is a flow chart showing a non-limiting example of the flow of a process performed by a terminal apparatus (referred to as a "terminal process")
Figure 14:
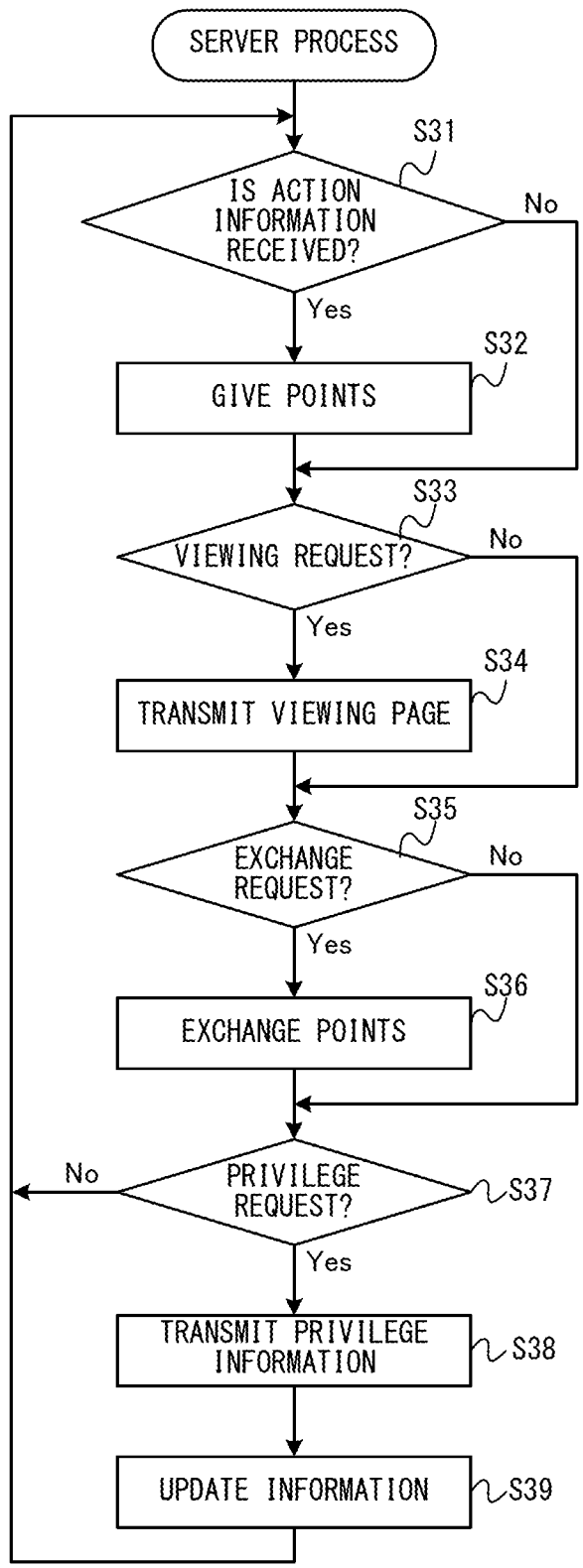
FIG. 14 is a flow chart showing a non-limiting example of the flow of a process performed by the server (referred to as a "server process")

Next, with reference to FIGS. 13 and 14, a description is given of a specific example of a process performed by each apparatus (i.e., the server 1 and each terminal apparatus) included in the information processing system according to the exemplary embodiment.

(4-1) Process Performed by Terminal Apparatus

First, a description is given of a specific example of the process performed by the terminal apparatus (the smartphone 3 and the game apparatus 4). FIG. 13 is a flow chart showing an example of the flow of the process performed by the terminal apparatus (referred to as a "terminal process"). A series of processes shown in FIG. 13 is, for example, started in accordance with the fact that a predetermined application is started by the terminal apparatus.

The predetermined application is an application in which a point earning action is detected, and action information is transmitted. If the terminal apparatus is the smartphone 3, the predetermined application is a game application in which an action of the user regarding game play is detected. If the terminal apparatus is the game apparatus 4, the predetermined application is a game application in which an action of the user regarding game play is detected, an application in which an action regarding an advertisement is detected (e.g., a moving image reproduction application for viewing the advertisement), or an application in which an action regarding a purchase is detected (e.g., an application for purchasing a product and/or a service in a shopping site). It should be noted that the predetermined application may be a dedicated application in which an action of the user is detected, and action information is transmitted. The execution of such a dedicated application may be started in accordance with the start of the terminal apparatus.

It should be noted that in the exemplary embodiment, the description is given on the assumption that the processes of the steps shown in FIG. 13 or 14 are performed by the processing section (specifically, the CPU) of the server 1 or the terminal apparatus executing the predetermined application. In another exemplary embodiment, however, the processes of some of the steps in the flow charts may be performed by a processor or a dedicated circuit other than the CPU.

In addition, the processing section of the server 1 or the terminal apparatus performs each process shown in FIG. 13 or 14 using a memory. That is, the processing section stores, in the memory, information (in other words, data) obtained by each processing step. Then, if the information is to be used in the subsequent processing steps, the processing section reads the information from the memory and uses the information. Further, to transmit information from the server 1 itself or the terminal apparatus itself to another apparatus in each process shown in FIGS. 13 and 14, the processing section transmits the information to the communication section.

In addition, the processes of all of the steps in the flow chart shown in FIGS. 13 and 14 are merely illustrative. Thus, the processing order of the steps may be changed, or another process may be performed in addition to or instead of the processes of all of the steps, so long as similar results are obtained.

In step S20, the CPU of the processing section 13 or 24 (hereinafter referred to simply as the "CPU" in the description of this flow chart) determines whether or not the user performs the action of acquiring points. That is, the CPU determines whether or not the action of acquiring points is detected. If the result of the determination in step S20 is affirmative, the process of step S21 is performed. If, on the other hand, the result of the determination in step S20 is negative, the process of step S21 is skipped, and the process of step S22 described later is performed.

In step S21, the CPU transmits action information indicating the action detected in step S20 to the server 1 via the communication section (the mobile communication section 16 of the smartphone 3 or the wireless communication section 27 of the game apparatus 4). Specifically, the action information is transmitted to the server 1 by the method described above in step S2 or S4. It should be noted that the process of step S21 is performed at any timing. For example, if the communication section cannot communicate with the server 1 when the result of the determination in step S20 is affirmative, the CPU may wait for the process of step S21 until the communication section can communicate with the server 1. Then, after the communication section can communicate with the server 1, the CPU may perform the process of step S21. After the process of step S21, the process of step S22 is performed.

In step S22, the CPU determines whether or not the user gives the above viewing instruction. If the result of the determination in step S22 is affirmative, the process of step S23 is performed. If, on the other hand, the result of the determination in step S22 is negative, the process of step S23 is skipped, and the process of step S24 described later is performed.

In step S23, the CPU makes the above viewing request to the server 1 (step S5 shown in FIG. 7). In accordance with this viewing request, a viewing page is transmitted from the server 1. Thus, the CPU causes the display section 28 to display the received viewing page. After the process of step S23, the process of step S24 is performed. It should be noted that a series of processes of steps S24 to S29 after step S23 is a process performed while a web page (i.e., a viewing page, a point exchange page, or a privilege page) provided by the server 1 is displayed on the terminal apparatus.

In step S24, the CPU determines whether or not the user gives the above point exchange instruction. That is, in the state where the above point exchange page is displayed in the display section 28, the CPU determines whether or not the above point exchange instruction is given. If the result of the determination in step S24 is affirmative, the process of step S25 is performed. If, on the other hand, the result of the determination in step S24 is negative, the process of step S25 is skipped, and the process of step S26 described later is performed.

In step S25, the CPU makes the above point exchange request to the server 1 (step S9 shown in FIG. 7). In accordance with this point exchange request, the server 1 exchanges primary play points regarding the user for secondary play points. After the process of step S25, the process of step S26 is performed.

In step S26, the CPU determines whether or not the user gives the above privilege acquisition instruction. That is, in the state where the above privilege page is displayed on the display section 28, the CPU determines whether or not the privilege acquisition instruction is given. If the result of the determination in step S26 is affirmative, the processes of steps S27 and S28 are performed. If, on the other hand, the result of the determination in step S26 is negative, the processes of steps S27 and S28 are skipped, and the process of step S29 described later is performed.

In step S27, the CPU makes the above privilege acquisition request to the server 1 (step S12 shown in FIG. 7). In accordance with this privilege acquisition request, the server 1 transmits, to the terminal apparatus, privilege information regarding a privilege according to the privilege acquisition request. After the process of step S27, the process of step S28 is performed.

In step S28, the CPU receives the privilege information transmitted from the server 1 and performs information processing corresponding to the privilege information. For example, if the privilege information indicates a notification that a privilege is to be given, the CPU performs information processing for presenting the notification to the user (e.g., displaying a notification image on the display section 28). Further, if the privilege information is content data that is a privilege itself, the CPU performs information processing for storing the data in a predetermined storage section so that the data can be executed in a predetermined application. After the process of step S28, the process of step S29 is performed.

In step S29, the CPU determines whether or not the viewing of the web page (i.e., a viewing page, a point exchange page, or a privilege page) provided by the server 1 is to be ended. For example, the CPU determines whether or not the user gives an instruction to end the viewing. If the result of the determination in step S29 is negative, the process of step S24 is performed again. In this case, the series of processes of steps S24 to S29 is repeatedly performed until it is determined in step S29 that the viewing of the web page is to be ended. If, on the other hand, the result of the determination in step S29 is affirmative, the process of step S20 is performed again. It should be noted that a series of processes of steps S20 to S29 in the terminal process shown in FIG. 13 is repeatedly performed until the execution of the predetermined application is ended, and ends in accordance with the end of the execution of the predetermined application.

(4-2) Process Performed by Server 1

Next, a description is given of a specific example of the process performed by the server 1. FIG. 14 is a flow chart showing an example of the flow of the process performed by the server 1 (referred to as a "server process"). A series of processes shown in FIG. 14 is continuously performed during the action of the server 1.

In step S31, the CPU of the server 1 determines whether or not action information is received from the terminal apparatus. If the result of the determination in step S31 is affirmative, the process of step S32 is performed. That is, in step S32, the CPU performs the process of giving points to the user based on the action information received in step S31 (step S2 or S4 shown in FIG. 7). After the process of step S32, the process of step S33 is performed.

If, on the other hand, the result of the determination in step S31 is negative, the process of step S32 is skipped, and the process of step S33 is performed.

In step S33, the CPU determines whether or not information of a viewing request is received from the terminal apparatus. If the result of the determination in step S33 is affirmative, the process of step S34 is performed. That is, in step S34, the CPU transmits a viewing page to the terminal apparatus. In accordance with this, the viewing page is displayed on the terminal apparatus. After the process of step S34, the process of step S35 is performed.

If, on the other hand, the result of the determination in step S33 is negative, the process of step S34 is skipped, and the process of step S35 is performed.

In step S35, the CPU determines whether or not information of a point exchange request is received from the terminal apparatus. If the result of the determination in step S35 is affirmative, the process of step S36 is performed. That is, in step S36, the CPU exchanges points in accordance with the point exchange request (step S10 shown in FIG. 7). After the process of step S36, the process of step S37 is performed.

If, on the other hand, the result of the determination in step S35 is negative, the process of step S36 is skipped, the process of step S37 is performed.

In step S37, the CPU determines whether or not information of a privilege acquisition request is received from the terminal apparatus. If the result of the determination in step S37 is affirmative, the processes of steps S38 and S39 are performed. If, on the other hand, the result of the determination in step S37 is negative, the processes of steps S38 and S39 are skipped, and the process of step S31 is performed again.

In steps S38 and S39, the CPU performs the process of giving a privilege to the user in accordance with the privilege acquisition request (step S13 shown in FIG. 7). That is, in step S38, the CPU transmits privilege information to the terminal apparatus. Further, in step S39, the CPU reflects the fact that a privilege is given, thereby updating the various pieces of information (i.e., the privilege management information and the point information) stored in the storage section. After the process of step S39, the process of step S31 is performed again.

[5. Variations]

(Variations Regarding Terminal Apparatus)

In the above exemplary embodiment, the terminal apparatus in which the above point earning action is performed is the smartphone 3 or the game apparatus 4. Here, in another exemplary embodiment, the terminal apparatus in which the point earning action is performed may be an information processing apparatus other than the smartphone 3 and the game apparatus 4. Specifically, the terminal apparatus in which the point earning action is performed may be an information processing apparatus (e.g., a personal computer) on which a website provided by the server 1 can be viewed. For example, the server 1 may give points in accordance with the action of viewing the website on the information processing apparatus.

(Variations Regarding Point Earning Action)

In addition, the point earning action is not limited to the above three types of actions (see FIG. 4) in the above exemplary embodiment, and may be another action. For example, in another exemplary embodiment, the point earning action may be the visit of the user having the terminal apparatus with themselves to a particular place. The particular place is any place, and may be, for example, a movie theater, a theme park, a store, or the like. More specifically, the particular place may be a place related to a predetermined application executed by the terminal apparatus (e.g., a movie theater or a theme park regarding a character that appears in a game application, a store that sells a game application, or the like).

It should be noted that the method for detecting the fact that the user having the terminal apparatus with themselves visits the particular place is any method. For example, if the terminal apparatus has a position detection function, the terminal apparatus may determine whether or not a position detected by the terminal apparatus is included in the range of the particular place. Further, for example, the terminal apparatus may determine whether or not a predetermined signal from a transmission apparatus installed in the particular place is received.

(Variations Regarding Points)

In the above exemplary embodiment, the server 1 gives points of different types in accordance with the three types of actions (see FIG. 4) in the above exemplary embodiment. Here, in another exemplary embodiment, the number of types of points to be given may be any number, and points of two types or points of four or more types may be given. Further, the method for dividing actions corresponding to points of various types into types is any method, and is not limited to the dividing method in the above exemplary embodiment (the action regarding game play, the action regarding an advertisement, and the action regarding a purchase). For example, in another exemplary embodiment, in accordance with a terminal apparatus in which an action is performed, the server 1 may give points of different types. Further, for example, in accordance with the type of an application in which an action is performed (e.g., based on whether the application is a game application or a browser application or the like), the server 1 may give points of different types. It should be noted that in another exemplary embodiment, the server 1 may give points of the same type based on different types of actions (e.g., the action regarding game play and the action regarding an advertisement) (in other words, the action regarding game play and the action regarding an advertisement may be classified into the same type of action).

In addition, in the above exemplary embodiment, the server 1 presents to the user the numbers of points in the form in which primary play points (i.e., medals) and secondary play points (i.e., mushrooms) can be distinguished from each other (FIG. 5). Here, in another exemplary embodiment, the server 1 may present to the user the numbers of points in the form in which primary play points and secondary play points are not distinguished from each other.

Figure 15:
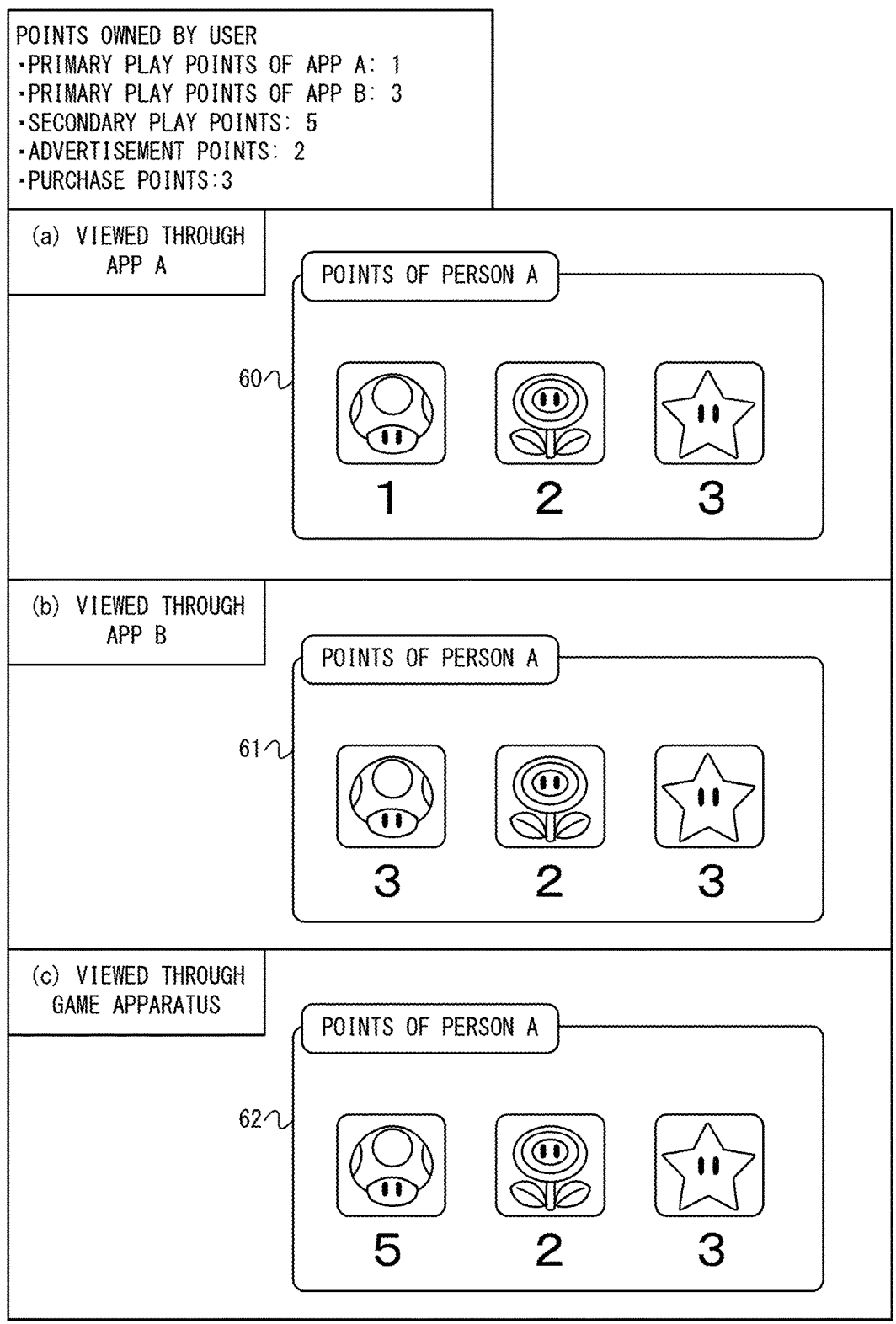
FIG. 15 is a diagram showing a non-limiting example of a method for presenting points in a variation of the above exemplary embodiment.

FIG. 15 is a diagram showing an example of the method for presenting points in a variation of the above exemplary embodiment. It should be noted that in FIG. 15, as an example, a case is described where the number of points of each type owned by the user is as follows.

Primary play points of the application A: 1
Primary play points of the application B: 3
Secondary play points: 5
Advertisement points: 2
Purchase points: 3

In FIG. 15, (a) shows a point image 60 in a case where a viewing page is acquired and displayed in the application A. The point image 60 represents the numbers of play points, advertisement points, and purchase points (the same applies to point images 61 and 62). As shown in FIG. 15, the numbers of play points represented by the point image 60 are the number of primary play points of the application A.

In addition, in FIG. 15, (b) shows the point image 61 in a case where a viewing page is acquired and displayed in the application B. As shown in FIG. 15, the numbers of play points represented by the point image 61 are the number of primary play points of the application B.

In addition, in FIG. 15, (c) shows the point image 62 in a case where a viewing page is acquired and displayed in the game apparatus 4. As shown in FIG. 15, the numbers of play points represented by the point image 62 are the number of secondary play points. It should be noted that in another exemplary embodiment, the numbers of play points represented by the point image 62 may be the total of the sum of the numbers of primary play points of the respective types exchanged for secondary play points, and the number of secondary play points.

As described above, the server 1 may present primary play points and secondary play points to the user in the form in which the primary play points and the secondary play points are not distinguished from each other (i.e., both the primary play points and the secondary play points are represented by the number of mushrooms). At this time, the server 1 may provide the terminal apparatus with a viewing page representing play points corresponding to a terminal apparatus or an application having made a viewing request. That is, in a case where a viewing page is displayed in the application A, the server 1 may generate a viewing page representing the number of primary play points of the application A. In a case where a viewing page is displayed in the application B, the server 1 may generate a viewing page representing the number of primary play points of the application B. In a case where a viewing page is displayed in the game apparatus 4, the server 1 may generate a viewing page representing the number of secondary play points.

(Variation in which Plurality of Users Share Users' Company's Service)

In another exemplary embodiment, the server 1 may allow a plurality of users having different accounts for a service provided by the server 1 to share points. That is, the server 1 may be able to set a single group for a plurality of accounts (in other words, users). At this time, user information (see FIG. 6) may be associated with a group ID indicating a group to which accounts indicated by the user information belong. This group may be, for example, a family, and the user may make a setting so that accounts of a plurality of users in the same family are included in a single group. For example, if a user who is a parent newly sets an account of their child, the parent user and the child user may be set in a single group.

In the above, the server 1 may make a setting so that points are shared in a single group, that is, a single piece of point information is stored for the single group (or point information of each user included in the group has the same content). Further, if points are given to a certain user, the server 1 may update point information set for a group to which the user belongs. Further, in accordance with a privilege acquisition request from a terminal apparatus of a certain user, the server 1 may transmit privilege information to a terminal apparatus of another user belonging to the same group as the user.

It should be noted that (a part of) the network service by the server 1 may be shared by users in a group. Specifically, the payments of fees regarding accounts included in a single group may be lumped together, and a predetermined user in the group may make the payment. Further, the use of a content provided in the network service (e.g., an application, music, a moving image, or the like) may be permitted on a group-by-group basis. That is, if a certain user purchases a content in the network service, another user included in the same group as the user may also be allowed to use the content.

(Variations Regarding Processes Performed by Server and Terminal)

In another exemplary embodiment, a part of the process performed on the server side in the above exemplary embodiment may be performed on the terminal side (i.e., by the smartphone 3 and/or the game apparatus 4). Further, in another exemplary embodiment, a part of the process performed on the terminal side in the above exemplary embodiment may be performed on the server side.

[6. Operation and Effect]

As described above, the information processing system according to the above exemplary embodiment includes one or more terminal apparatuses (i.e., the smartphone 3 and the game apparatus 4) and the server 1. Each terminal apparatus transmits action information indicating an action of the user regarding the terminal apparatus to the server 1 (steps S1 and S3). Further, the server 1 stores history information indicating a numerical value corresponding to the history of the action of the user (information indicating points of each type included in point information) with respect to each type of action (FIG. 6). The server 1 receives the action information from the terminal apparatus, and based on the received action information, updates the history information corresponding to the action information (steps S2 and S4). Under the condition that the combination of a plurality of pieces of history information (i.e., the combination of points) satisfies a predetermined combination condition, the server 1 transmits provision information (i.e., privilege information) to a terminal apparatus that is the same as or different from the terminal apparatus as the transmission source of the action information (step S13). The terminal apparatus receiving the privilege information from the server 1 performs predetermined information processing based on the received privilege information (step S28).

Based on the above, the information processing system stores pieces of history information corresponding to a plurality of types of actions, and in a case where the combination of the pieces of history information satisfies a combination condition, transmits privilege information to the terminal apparatus. Based on this, the user performs a plurality of types of actions to obtain a privilege. Thus, the server 1 can provide the user with a motivation to perform various actions in the terminal apparatus.

In addition, in the above exemplary embodiment, the server 1 receives, from the terminal apparatus (e.g., the smartphone 3), first action information indicating an operation of the user regarding a first application (e.g., the smartphone app A) executed by the terminal apparatus (step S2) and receives, from the terminal apparatus, second action information indicating an operation of the user regarding a second application (e.g., the smartphone app B) executed by the terminal apparatus (step S2). Based on the first action information, the server 1 updates history information corresponding to the first action information (i.e., secondary play points based on primary play points of the smartphone app A), and based on the second action information, the server 1 updates history information corresponding to the second action information (i.e., secondary play points based on primary play points of the smartphone app B).

Based on the above, history information is updated in accordance with operations in different applications, and privilege information is transmitted based on the combination of pieces of updated history information. Thus, the server 1 can determine the transmission of a single piece of privilege information (e.g., the giving of a privilege) based on operations in two different types of applications. That is, the server 1 can provide the user with a motivation to use two types of applications in one or more terminal apparatuses.

In addition, in the above exemplary embodiment, at least one of a plurality of pieces of history information includes first primary history information corresponding to the first application (i.e., primary play points of the smartphone app A), second primary history information corresponding to the second application (i.e., primary play points of the smartphone app B), and secondary history information (i.e., secondary play points) (FIG. 6). The server 1 updates the first primary history information based on the first action information, updates the second primary history information based on the second action information, and calculates the secondary history information based on the first primary history information and the second primary history information (i.e., exchanges primary play points for secondary play points). Further, under the condition that a plurality of pieces of history information including secondary history information (i.e., secondary play points, advertisement points, and purchase points) satisfy a predetermined combination condition, the server 1 transmits provision information.

Based on the above, in accordance with actions in different applications, each of the pieces of primary history information is updated, and based on the pieces of primary history information, the secondary history information is calculated. Based on this, the server 1 can calculate a single piece of secondary history information in accordance with actions in different applications. In other words, the server 1 can collectively manage, as a single piece of history information, actions in different applications.

In addition, under the condition that individual primary history information satisfies a predetermined individual condition, the server 1 transmits provision information regarding an application corresponding to the individual condition (i.e., data regarding a smartphone app) to the terminal apparatus as the transmission source of the action information (i.e., the smartphone 3).

Based on the above, in addition to the transmission of provision information to the terminal apparatus in accordance with a single piece of history information collectively regarding different applications, provision information is also transmitted to the terminal apparatus in accordance with primary history information of each individual application (the first and second applications). Based on this, it is possible to provide, with respect to each individual application, the user with a motivation to use the application.

In addition, in the above exemplary embodiment, in accordance with a request from the terminal apparatus (i.e., a point exchange request), the server 1 converts a numerical value indicated by the primary history information into a numerical value indicated by the secondary history information (i.e., exchanges points), thereby calculating the secondary history information. Further, the server 1 does not convert a numerical value indicated by certain primary history information into a numerical value indicated by another primary history information (in other words, does not receive from the terminal apparatus a request to perform the conversion).

Based on the above, pieces of primary history information corresponding to actions in two particular applications executed in a single terminal apparatus are not exchanged for each other. Based on this, it is possible to urge the user to use each of the above applications.

In addition, in the above exemplary embodiment, in accordance with a request from the terminal apparatus (i.e., a point exchange request), the server 1 converts a numerical value indicated by the primary history information into a numerical value indicated by the secondary history information (i.e., exchanges points), thereby calculating the secondary history information. Further, the server 1 does not convert a numerical value indicated by the secondary history information into a numerical value indicated by the primary history information (in other words, does not receive from the terminal apparatus a request to perform the conversion).

Based on the above, a numerical value indicated by the secondary history information is not exchanged for a numerical value indicated by the primary history information. Based on this, it is possible to prevent a numerical value indicated by certain primary history information from being converted into a numerical value indicated by another primary history information via the secondary history information. Consequently, it is possible to urge the user to use each of the above applications.

In the above exemplary embodiment, the information processing system includes a first type of terminal apparatus (the smartphone 3) and a second type of terminal apparatus (the game apparatus 4). Here, the first type of terminal apparatus has a first platform compatible with the above first and second applications (i.e., smartphone apps) and incompatible with a third application (i.e., a game apparatus app). Further, the second type of terminal apparatus has a second platform compatible with the above third application and incompatible with the above first and second applications. At this time, the server 1 receives the first action information and the second action information from the first type of terminal apparatus and receives third action information indicating an operation of the user regarding the third application from the second type of terminal apparatus. The server 1 updates the secondary history information using the above third action information.

Based on the above, in accordance with an action in the second type of terminal apparatus, the secondary history information is updated. Thus, the user can update history information (e.g., can accumulate points) using two types of terminal apparatuses. Further, the user can directly update the secondary history information in accordance with an action in the second type of terminal apparatus and therefore can update the secondary history information more simply. This can improve convenience.

In addition, in the above exemplary embodiment, the information processing system includes the first type of terminal apparatus (i.e., the smartphone 3) and the second type of terminal apparatus (the game apparatus 4). The server 1 receives, from the first type of terminal apparatus, first action information indicating an operation of the user regarding the first application executed by the first type of terminal apparatus (step S2) and receives, from the second type of terminal apparatus, second action information indicating an operation of the user regarding the third application executed by the second type of terminal apparatus (step S4).

Based on the above, history information is updated in accordance with actions in two different types of terminal apparatuses. Thus, the user can update history information (e.g., can accumulate points) using two types of terminal apparatuses.

In the above, the server 1 updates predetermined history information based on the first action information and updates the predetermined history information based on the second action information.

Based on the above, the same type of history information is updated in accordance with actions in different applications. That is, the user can update the same history information (e.g., can accumulate points) by actions in different applications.

In addition, in the above exemplary embodiment, the terminal apparatus can transmit action information indicating a first action (e.g., the operation of clearing a predetermined stage in a game, as the action regarding game play) and can transmit action information indicating a second action (e.g., the operation of acquiring a particular item in a game, as the action regarding game play). Based on the action information indicating the first action, the server 1 updates predetermined history information corresponding to the action information (i.e., information of play points), and based on the action information indicating the second action, the server 1 updates the predetermined history information (i.e., information of play points).

Based on the above, the same type of history information is updated in accordance with two different actions performed in the terminal apparatus. That is, the user can update the same history information (e.g., accumulate points) by different actions in the terminal apparatus.

In addition, in the above exemplary embodiment, the server 1 stores user identification information indicating a user and a plurality of types of history information regarding the user in association with each other (FIG. 6). The server 1 receives action information associated with user identification information from a terminal apparatus. Based on the action information, the server 1 updates history information stored in association with the user identification information associated with the action information.

Based on the above, the server 1 can easily manage history information set for each user. Further, based on the above, even if action information regarding a single user is transmitted from each of a plurality of terminal apparatuses to the server 1, it is possible to easily update history information set for the single user in accordance with each of the pieces of action information.

In addition, in the above exemplary embodiment, every time action information is received, the server 1 increases a numerical value indicated by history information corresponding to the action information (i.e., the number of points), thereby updating the history information.

Based on the above, the server 1 can manage history based on a numerical value that increases every time an action by the user is performed. For example, the server 1 can present the history of an action to the user in an easily understandable manner, using the numerical value.

In addition, in the above exemplary embodiment, regarding a plurality of pieces of history information, the server 1 does not convert a numerical value indicated by one of the plurality of pieces of history information into a numerical value indicated by another one of the pieces of history information (in other words, does not receive from the terminal apparatus a request to perform such a conversion).

Based on the above, the conversion of numerical values indicated by a plurality of pieces of history information (e.g., the exchange of points) is prohibited. Consequently, the server 1 can provide the user with a motivation to perform actions corresponding to respective pieces of history information more certainly.

It should be noted that action information may indicate at least one of the following actions.

- The terminal apparatus logs into a predetermined network service
- A predetermined condition (e.g., the clearing of a stage in a game application, the acquisition of an item, or the like) is satisfied in a predetermined application executed by the terminal apparatus
- A predetermined operation regarding a notification to the user (including an advertisement) (e.g., the operation of viewing an advertisement, the operation of setting the terminal apparatus so that the terminal apparatus can receive an advertisement, or the like) is performed in the terminal apparatus
- In a predetermined application executed by the terminal apparatus, the user of the terminal apparatus communicates (in other words, interacts) with another user (e.g., a friend) (e.g., exchanges a message, plays a game together with a friend, newly registers a friend, or the like)
- A content is acquired (in other words, purchased) in the terminal apparatus
- The user who owns the terminal apparatus visits a predetermined place (e.g., a movie theater, a theme park, a store, or the like)

In the above exemplary embodiment, the server 1 transmits, as provision information, data of a content to be given as a privilege to the user and/or information of a notification regarding the giving of a privilege (e.g., a content) (step S13).

Based on the above, the server 1 gives the user a privilege (specifically, a content) corresponding to history information, and thereby can effectively provide the user with a motivation to perform an action in the terminal apparatus.

In the above exemplary embodiment, the server 1 stores information indicating a plurality of types of contents and information indicating combination conditions for allowing the contents to be given, in association with each other (FIG. 12). The server 1 receives, from the terminal apparatus, selection information indicating a content selected by the user (i.e., information of a privilege request) among contents satisfying the combination conditions (step S13). The server 1 transmits provision information regarding a content indicated by the received selection information.

Based on the above, the user can acquire a privilege (specifically, a content) desired by the user themselves. Thus, the server 1 can more effectively provide the user with a motivation to perform an action in the terminal apparatus.

In the above exemplary embodiment, the information processing system includes the above first terminal apparatus (i.e., the smartphone 3) and the above second terminal apparatus (i.e., the game apparatus 4). The server 1 receives action information from the first terminal apparatus (step S2). The server 1 identifies a second terminal apparatus corresponding to the first terminal apparatus having transmitted the action information. If a combination condition is satisfied, the server 1 transmits provision information to a second terminal apparatus corresponding to the first terminal apparatus having transmitted the action information that satisfies the combination condition (e.g., a second terminal apparatus associated with the user of the first terminal apparatus in the server 1). It should be noted that the first terminal apparatus and the second terminal apparatus may be terminal apparatuses of the same type (e.g., having the same platform), or may be terminal apparatuses of different types.

Based on the above, the user can receive provision information (e.g., can receive a privilege or a notification of a privilege) in a terminal apparatus different from a terminal apparatus in which an action for updating history information is performed. This can improve the convenience for the user.

It should be noted that the method for identifying a second terminal apparatus is any method. For example, in the above exemplary embodiment, the server 1 receives user identification information from the terminal apparatus, and based on the received user identification information, identifies a second terminal apparatus. That is, the server 1 transmits, to a terminal apparatus (e.g., the game apparatus 4 in the example shown in FIG. 7) to which to transmit user identification information indicating the same user as a user indicated by user identification information transmitted from a terminal apparatus (e.g., the smartphone 3 in the example shown in FIG. 7) as the transmission source of action information, provision information corresponding to the action information. Further, as described above, in a case where provision information is to be transmitted to the terminal apparatus by push transmission, the server 1 may identify a second terminal apparatus based on the above transmission destination information.

It should be noted that in the above exemplary embodiment, the terminal apparatus transmits, to the server, action information indicating an operation of the user regarding a game application executed by the terminal apparatus (step S2). Consequently, it is possible to urge the user to use a game application in the terminal apparatus.

In the above exemplary embodiment, the server 1 receives, as action information, a first type of action information indicating that a content is purchased in the terminal apparatus (i.e., action information indicating the action regarding a purchase), a second type of action information different from the first type (i.e., action information indicating the action regarding game play, or the action regarding an advertisement). Based on the first type of action information, the server 1 updates first history information (i.e., information of purchase points) in a plurality of pieces of history information, and based on the second type of action information, updates history information different from the first history information (i.e., information of play points or advertisement points).

Based on the above, different pieces of history information are updated depending on the action regarding a purchase or the actions other than a purchase. That is, the server 1 can distinguish the action regarding a purchase from the other actions when managing history.

In the above exemplary embodiment, as provision information, the server 1 can transmit information regarding a first type of privilege (i.e., a coupon), which is points that can be used by the user to purchase a product and/or a service, and can transmit information regarding a second type of privilege (i.e., data regarding the game apparatus 4), which is data that can be used in a predetermined application. The server 1 stores, as a combination condition corresponding to the first privilege, information indicating a condition in which the proportion of a numerical value indicated by the first history information to the sum of numerical values indicated by the pieces of history information for satisfying the combination condition is set to be relatively high (i.e., combination conditions (5, 2, 3) and (10, 4, 5) shown in FIG. 11). Further, the server 1 stores, as a combination condition corresponding to the second privilege, information indicating a condition in which the proportion of a numerical value indicated by the first history information to the sum of numerical values indicated by the pieces of history information for satisfying the combination condition is set to be relatively low (i.e., a combination condition (10, 2, 1) shown in FIG. 11).

Based on the above, in the case of a monetary privilege regarding a purchase, the numerical value of the first history information corresponding to the action regarding a purchase is requested to be relatively great. In the case of a privilege that is not monetary and is different from this monetary privilege, the numerical value of the first history information corresponding to the action regarding a purchase is requested to be relatively small. That is, to obtain a monetary privilege, the user performs the action regarding a purchase relatively often, whereas to obtain a privilege that is not monetary, the user does not need to perform the action regarding a purchase so often. Based on this, it is possible to set a combination condition for the user to acquire a privilege, to an appropriate content corresponding to the privilege.

As described above, the information processing system according to the above exemplary embodiment can be used as, for example, an information processing system for providing a network service for a smartphone and/or a game apparatus in order, for example, to provide a user with a motivation to perform various actions in a terminal apparatus.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system including one or more terminal apparatuses and a server, each of the one or more terminal apparatuses comprising:
one or more processors; and
a first transceiver configured to transmit, to the server, action information indicating an action of a user regarding the respective terminal apparatus, the server comprising:
a second transceiver configured to receive first action information indicating an operation of the user regarding a first application executed by the one or more terminal apparatuses and second action information indicating an operation of the user regarding a second application executed by the one or more terminal apparatuses;
a store configured to store, for respective types of actions, pieces of history information, each indicating a numerical value corresponding to history of the action of the user, wherein different ones of the plurality of pieces of history information respectively include first primary history information for the first application, second primary history information for the second application, and secondary history information; and
one or more processors controllable to cause the server to at least:
update the first primary history information based on the first action information, update the second primary history information based on the second action information, and calculate the secondary history information based on the first primary history information and the second primary history information; and
conditioned on the plurality of pieces of history information including the secondary history information satisfying a predetermined combination condition, transmit provision information to a receiving terminal apparatus that is the same as or different from the terminal apparatus that transmitted the action information,
wherein the receiving terminal apparatus, upon reception of the provision information from the server, is controlled to perform predetermined information processing based on the received provision information.

2. The information processing system according to claim 1, wherein conditioned on an individual piece of primary history information satisfying a predetermined individual condition, the server is configured to control the second transceiver to transmit provision information regarding an application corresponding to the individual piece of primary history information to the terminal apparatus that is the transmission source of the corresponding action information.

3. The information processing system according to claim 1, wherein the one or more processors of the server are further controllable to cause the server to at least, in accordance with a request from the one or more terminal apparatuses, convert a numerical value indicated by at least part of the primary history information into a numerical value indicated by the secondary history information in order to calculate the secondary history information, without also converting numerical value indicated by a certain piece of primary history information into a numerical value indicated by another piece of primary history information.

4. The information processing system according to claim 1, wherein the one or more processors of the server are further controllable to cause the server to at least, in accordance with a request from the one or more terminal apparatuses, convert a numerical value indicated by at least part of the primary history information into a numerical value indicated by the secondary history information in order to calculate the secondary history information, without also converting the numerical value indicated by the secondary history information into the numerical value indicated by the primary history information.

5. The information processing system according to claim 1, further including:
at least first and second terminal apparatuses, wherein:
the first terminal apparatus is a first type of terminal apparatus having a first platform compatible with the first application and the second application, and incompatible with a third application,
the second terminal apparatus is a second type of terminal apparatus having a second platform compatible with the third application, and incompatible with the first application and the second application,
the second transceiver of the server is configured to receive the first action information and the second action information from the first type of terminal apparatus and is configured to receive the third action information indicating an operation of the user regarding the third application from the second type of terminal apparatus, and
the one or more processors of the server are further controllable to cause the server to at least update the secondary history information using the third action information.

6. The information processing system according to claim 1, further including:
at least first and second terminal apparatuses, wherein:
the first terminal apparatus is a first type of terminal apparatus having a first platform compatible with a first application and incompatible with a third application,
the second terminal apparatus is a second type of terminal apparatus having a second platform compatible with the third application and incompatible with the first application,
the second transceiver of the server is further configured to receive, from the first type of terminal apparatus, first action information indicating an operation of the user regarding the first application executed by the first type of terminal apparatus and is further configured to receive, from the second type of terminal apparatus, second action information indicating an operation of the user regarding the third application executed by the second type of terminal apparatus.

7. The information processing system according to claim 1, wherein the one or more processors of the server are further controllable to cause the server to at least update predetermined history information based on the first action information and update the predetermined history information based on the second action information.

8. The information processing system according to claim 1, wherein:
first action information indicating a first action and second action information indicating a second action are transmittable from the one or more terminal apparatuses, and
the one or more processors of the server are further controllable to cause the server to at least update predetermined history information based on the first action information and update the predetermined history information based on the second action information.

9. The information processing system according to claim 1, wherein:

the store of the server is further configured to store, in association with each other, user identification information indicating the user, and the plurality of pieces of history information regarding the user, the second transceiver of the server is further configured to receive the action information associated with the user identification information from the one or more terminal apparatuses, and one or more processors of the server are further controllable to cause the server to at least update, based on the received action information, one of the pieces of history information stored in association with the user identification information associated with the action information.

10. The information processing system according to claim 1, wherein the one or more processors of the server are further controllable to cause the server to at least increase a numerical value indicated by one of the pieces of history information corresponding to the action information in order to update the history information, each time the action information is received.

11. The information processing system according to claim 1, wherein a numerical value indicated by one of the plurality of pieces of history information is not converted into a numerical value indicated by another one of the pieces of history information.

12. The information processing system according to claim 1, wherein the action information indicates at least one of:
the fact that the terminal apparatus logs into a predetermined network service;
a predetermined condition is satisfied in a predetermined application executed by the one or more terminal apparatuses;
a predetermined operation regarding a notification to the user is performed in the one or more terminal apparatuses;
in a predetermined application executed by the one or more terminal apparatuses, the user thereof communicates with another user;
content is acquired in the one or more terminal apparatuses; and
the user who owns the one or more terminal apparatuses visits a predetermined place.

13. The information processing system according to claim 1, wherein the second transceiver is configured to transmit, as the provision information, data corresponding to content to be given to the user and/or information corresponding to a notification regarding giving of content.

14. The information processing system according to claim 13, wherein:
the store of the server is configured to store, in association with each other, information indicating a plurality of types of content and information indicating the combination condition for allowing the plurality of types of content to be given,
the second transceiver is configured to receive, from the one or more terminal apparatuses, selection information indicating content selected by the user from among contents for which the combination condition is satisfied, and
the second transceiver is configured to transmit provision information regarding the content indicated by the received selection information.

15. The information processing system according to claim 1, wherein conditioned on a combination of the plurality of pieces of history information satisfying a predetermined combination condition, the second transceiver is controlled to transmit the provision information to terminal apparatus that is the source of the action information.

16. The information processing system according to claim 1, wherein conditioned on a combination of the plurality of pieces of history information satisfying a predetermined combination condition, the second transceiver is controlled to transmit the provision information to a terminal apparatus different from the terminal apparatus that is the source of the action information.

17. The information processing system according to claim 16, wherein:
the second transceiver is configured to receive the action information from a first terminal apparatus,
the one or more processors of the server are further controllable to cause the server to at least identify a second terminal apparatus corresponding to the first terminal apparatus having transmitted the action information, and
when the combination condition is satisfied, the second transceiver is configured to transmit the provision information to the second terminal apparatus.

18. The information processing system according to claim 1, wherein each first transceiver is configured to transmit, to the server, action information indicating an operation of the user regarding a game application executed by the respective terminal apparatus.

19. The information processing system according to claim 1, further comprising a plurality of terminal apparatuses, wherein different types of action information indicate different types of operations taken with respect to different applications provided to different ones of the terminal apparatuses.

20. The information processing system according to claim 19, wherein the terminal apparatuses are one of at least first and second different device types.

21. The information processing system according to claim 19, wherein at least some of the terminal apparatuses are different types of game-playing devices.

22. The information processing system according to claim 19, wherein the provision information, once received, alter functionality of the application of the receiving terminal apparatus.

23. The information processing system according to claim 1, wherein the calculation of the secondary history information factors in the first primary history information and factors out the second primary history information.

24. A server configured to communicate with one or more terminal apparatuses,
each of the one or more terminal apparatuses being configured to transmit, to the server, action information indicating an action of a user regarding the respective terminal apparatus,
the server comprising:
a transceiver configured to receive first action information indicating an operation of the user regarding a first application executed by the one or more terminal apparatuses and second action information indicating an operation of the user regarding a second application executed by the one or more terminal apparatuses;
a store configured to store, for respective types of actions, pieces of history information, each indicating a numerical value corresponding to history of the action of the user, wherein different ones of the plurality of pieces of history information respectively include first primary history information for the first application, second primary history information for the second application, and secondary history information; and one or more processors controllable to cause the server to at least:
update the first primary history information based on the first action information, update the second primary history information based on the second action information, and calculate the secondary history information based on the first primary history information and the second primary history information, and conditioned on the plurality of pieces of history information including the secondary history information satisfying a predetermined combination condition, transmit provision information to a receiving terminal apparatus that is the same as or different from the terminal apparatus that transmitted the action information, wherein the receiving terminal apparatus, upon reception of the provision information from the server, is controlled to perform predetermined information processing based on the received provision information.

25. A non-transitory computer-readable storage medium having stored therein an information processing program executable by a server computer configured to communication with one or more terminal apparatuses, each of the one or more terminal apparatuses being configured to transmit, to the server computer, action information indicating an action of a user regarding the respective terminal apparatus, the server computer being configured to store, for respective types of actions, pieces of history information, each indicating a numerical value corresponding to history of the action of the user, the information processing program causing the server computer to execute operations comprising:
receiving first action information indicating an operation of the user regarding a first application executed by the one or more terminal apparatuses and second action information indicating an operation of the user regarding a second application executed by the one or more terminal apparatuses, wherein different ones of the plurality of pieces of history information respectively include first primary history information for the first application, second primary history information for the second application, and secondary history information;

update the first primary history information based on the first action information, update the second primary history information based on the second action information, and calculate the secondary history information based on the first primary history information and the second primary history information; and conditioned on the plurality of pieces of history information including the secondary history information satisfying a predetermined combination condition, transmitting provision information to a receiving terminal apparatus that is the same as or different from the terminal apparatus that transmitted the action information.

26. An information processing method executed in connection with an information processing system including one or more terminal apparatuses and a server, the method comprising:
receiving, from each of the one or more terminal apparatuses, action information indicating an action of a user regarding the respective terminal apparatus, receiving first action information indicating an operation of the user regarding a first application executed by the one or more terminal apparatuses and second action information indicating an operation of the user regarding a second application executed by the one or more terminal apparatuses;

storing, for respective types of actions, pieces of history information, each indicating a numerical value corresponding to history of the action of the user, wherein different ones of the plurality of pieces of history information respectively include first primary history information for the first application, second primary history information for the second application, and secondary history information;

updating the first primary history information based on the first action information, updating the second primary history information based on the second action information, and calculating the secondary history information based on the first primary history information and the second primary history information; and conditioned on the plurality of pieces of history information including the secondary history information satisfying a predetermined combination condition, transmitting provision information to a receiving terminal apparatus that is the same as or different from the terminal apparatus that transmitted the action information, wherein the receiving terminal apparatus, upon reception of the provision information from the server, is controlled to perform predetermined information processing based on the received provision information.

* * * * *